United States Patent
Spies et al.

(10) Patent No.: US 8,353,023 B2
(45) Date of Patent: Jan. 8, 2013

(54) IDENTITY-BASED-ENCRYPTION MESSAGE MANAGEMENT SYSTEM

(75) Inventors: Terence Spies, San Mateo, CA (US); Guido Appenzeller, Menlo Park, CA (US)

(73) Assignee: Voltage Security, Inc., Cupertino, CA (US)

( * ) Notice: Subject to any disclaimer, the term of this patent is extended or adjusted under 35 U.S.C. 154(b) by 0 days.

(21) Appl. No.: 13/250,950

(22) Filed: Sep. 30, 2011

(65) Prior Publication Data

US 2012/0023571 A1    Jan. 26, 2012

Related U.S. Application Data

(62) Division of application No. 12/398,986, filed on Mar. 5, 2009, now Pat. No. 8,041,953, which is a division of application No. 10/744,850, filed on Dec. 22, 2003, now Pat. No. 7,523,314.

(51) Int. Cl.
G06F 9/00 (2006.01)
(52) U.S. Cl. .......................................................... 726/12
(58) Field of Classification Search ...................... 726/12
See application file for complete search history.

(56) References Cited

U.S. PATENT DOCUMENTS

| | | | |
|---|---|---|---|
| 5,016,276 A | 5/1991 | Matumoto |
| 5,159,632 A | 10/1992 | Crandall |
| 5,271,061 A | 12/1993 | Crandall |
| 5,272,755 A | 12/1993 | Miyaji |
| 5,581,616 A | 12/1996 | Crandall |
| 6,061,448 A | 5/2000 | Smith |
| 6,192,407 B1 | 2/2001 | Smith |
| 6,487,599 B1 | 11/2002 | Smith |
| 6,609,196 B1 | 8/2003 | Dickinson |
| 6,650,890 B1 | 11/2003 | Irlam |
| 6,886,096 B2 | 4/2005 | Appenzeller |
| 6,904,521 B1 | 6/2005 | Jivsov |

(Continued)

FOREIGN PATENT DOCUMENTS

| WO | 02/51066 | 6/2002 |
| WO | 03/001326 | 1/2003 |
| WO | 03/017559 | 2/2003 |

OTHER PUBLICATIONS

Jeremy Horwits and Ben Lynn, "Toward Hierarchical Identity-Based Encryption," Advances in Cryptology: EUROCRYPT 2002, Lecture Notes in Computer Science, vol. 2332, pp. 466-481, 2002.

(Continued)

Primary Examiner — Jacob Lipman
(74) Attorney, Agent, or Firm — Treyz Law Group; G. Victor Treyz; David C. Kellogg

(57) ABSTRACT

Systems and methods for managing email are provided. Some of the email may be encrypted using identity-based-encryption (IBE) techniques. When an incoming IBE-encrypted message for a recipient in an organization is received by a gateway at the organization, the gateway may request an IBE private key from an IBE private key generator. The IBE private key generator may generate the requested IBE private key for the gateway. The gateway may use an IBE decryption engine to decrypt the incoming message. The decrypted message can be scanned for viruses and spam and delivered to the recipient. Outgoing email messages can also be processed. If indicated by message attributes or information provided by a message sender, an outgoing message can be encrypted using an IBE encryption engine and the IBE public key of a desired recipient.

19 Claims, 12 Drawing Sheets

U.S. PATENT DOCUMENTS

| | | | |
|---|---|---|---|
| 7,107,618 | B1 | 9/2006 | Gordon et al. |
| 7,523,314 | B2 | 4/2009 | Spies et al. |
| 2002/0076042 | A1 | 6/2002 | Sandhu |
| 2003/0115448 | A1 | 6/2003 | Bouchard |
| 2003/0131060 | A1 | 7/2003 | Hartselle |
| 2004/0098589 | A1 | 5/2004 | Appenzeller |
| 2004/0133520 | A1* | 7/2004 | Callas et al. ............... 705/51 |
| 2009/0172804 | A1 | 7/2009 | Spies et al. |

OTHER PUBLICATIONS

Xuejia Lai and James L. Massey, "A Proposal for a New Block Encryption Standard," Advances in Cryptology—EUROCRYPT '90, pp. 389-404, Proceedings, LNCS 473, Springer-Verlag, 1991.

Baltimore MailSecure(TM) Range Product Overview, published 2000.

Sans Institute et al., "Encrypted E-mail: Close One Door, Open Another," Jan. 1, 2001 (pp. 1-11) [Retrieved on Mar. 20, 2012]. Retrieved from the Internet:<URL: http://www.sans.org/reading_room/whitepapers/mailicous/encryted-e-mail-close-door-open_105>.

Baltimore, "MailSecure Range," Jan. 1, 2000 (pp. 1-34) [Retrieved on May 3, 2012]. Retrieved from the Internet: <URL: http://www.sss.co.nz/pdfs/mailsecure_overview.pdf>.

Mont M C et al., "The HP time vault service: innovating the way confidential information is disclosed, at the right time," HP Technical Report, Hewlett Packard, US, Sep. 4, 2002 (pp. 1-26).

* cited by examiner

IDENTITY-BASED-ENCRYPTION MESSAGE MANAGEMENT SYSTEM

This application is a division of patent application Ser. No. 12/398,986, filed Mar. 5, 2009 now U.S. Pat. No. 8,041,953, which is a division of patent application Ser. No. 10/744,850, filed Dec. 22, 2003, now U.S. Pat. No. 7,523,314, which are hereby incorporated by reference herein in their entireties. This application claims the benefit of and claims priority to patent application Ser. No. 12/398,986, filed Mar. 5, 2009, and patent application Ser. No. 10/744,850, filed Dec. 22, 2003, now U.S. Pat. No. 7,523,314.

BACKGROUND OF THE INVENTION

This invention relates to systems for managing messages, and more particularly, to message management systems that have identity-based-encryption capabilities.

Software packages and remotely-hosted third-party services are available for blocking unsolicited commercial email (spam) and for scanning email for viruses. Many businesses use such software and services in managing their email systems. In a typical installation, a firewall may be used to protect the network of a business from attacks. Spam filtering and virus scanning software is used to examine email that passes through the firewall.

Because some email is encrypted, businesses may need to use software that is capable of handling both encrypted and unencrypted email messages.

A variety of cryptographic techniques are used to encrypt email messages. With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to herein as PKE cryptographic systems.

Identity-based-encryption (IBE) systems have also been proposed. As with PKE cryptographic systems, a sender in an IBE system may encrypt a message for a given recipient using the recipient's public key. The recipient may then decrypt the message using the recipient's corresponding private key. The recipient can obtain the private key from a private key generator associated with the recipient.

Unlike PKE schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

It is an object of the present invention to provide message management systems with identity-based-encryption capabilities.

SUMMARY OF THE INVENTION

The present invention relates to message management systems with the ability to handle encrypted messages. The invention also relates to methods for using such systems to manage messages.

Message management functions may be provided by message processing applications. The message processing applications may run on gateway equipment at an organization, on a personal computer or other computing equipment operated by an individual, or on equipment at a third-party message management service to which an individual or organization can subscribe.

The message management applications may be used to scan email and other messages for viruses and to filter messages based on message content or other criteria. The message management applications can block spam, generate notifications, edit messages, perform archiving functions and message redirection, etc.

Messages may be encrypted using identity-based-encryption (IBE) schemes. Message processing applications may use IBE encryption and decryption engines to handle IBE message encryption and decryption.

An organization may have an internal network of users. A gateway may be used to connect the internal network to an external communications network such as the Internet. An IBE private key generator on the internal network may be used to provide IBE private keys to the gateway.

When the gateway receives an incoming message that has been encrypted using IBE, the gateway may request an appropriate IBE private key from the IBE private key generator. The IBE private key generator may verify that the gateway is authorized to receive the IBE private key, and, if the gateway is authorized, can generate the IBE private key in real time. The IBE private key may be provided to the gateway by the IBE private key generator over the internal network.

Message processing applications on the gateway can use an IBE decryption engine and the IBE private key to decrypt the IBE-encrypted message. The message processing applications may then process the unencrypted version of the message (e.g., for virus scanning, spam blocking, policy enforcement, etc.) and may provide the processed version of the message to an appropriate recipient within the organization.

Outgoing messages may also be processed by message processing applications on the gateway of an organization. For example, outgoing message may be scanned for spam or viruses, may be processed to enforce security policies and other policies, etc. Messages can be provided to the gateway from a sender in the organization over the organization's internal network. After the gateway has used the message processing applications to process an outgoing message, the message can be encrypted using an IBE encryption engine. The message processing application can encrypt all outgoing messages using IBE or can encrypt messages that are determined to contain sensitive information, that are destined to a particular address, or that satisfy other policy criteria. If desired, a sender of a message may provide information to the gateway with an outgoing message or in a separate communication that indicates to the gateway that the message should be encrypted. When the message processing applications on the gateway detect this information from the sender, the IBE encryption engine may be used to encrypt the outgoing message.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to message management systems with the ability to handle messages encrypted using identity-based encryption. The invention also relates to methods for using such systems.

Figure 1:
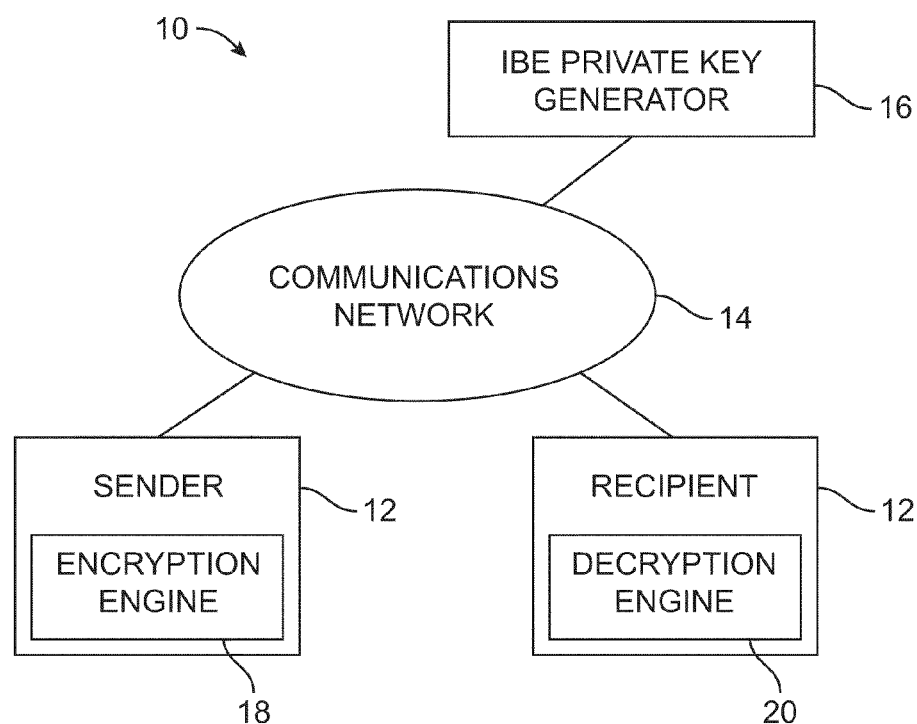
FIG. 1 is a diagram of an illustrative identity-based-encryption system in accordance with the present invention.

Equipment of the type shown in FIG. 1 may be used to support identity-based-encryption (IBE) techniques. A user in system 10 may send a secure message to one or more other users over a communications network 14. A sender is a user who sends a message. A recipient is a user who receives a message.

The present invention is sometimes described in connection with system environments in which the sender is an individual who is associated with one organization, whereas the recipient is an individual associated with another organization. In general, however, individuals, organizations, parts of organizations, or any other suitable parties or entities may exchange messages.

Moreover, the messages that are carried by the system need not be email messages, although email messages are used as an example. The messages may be email messages, instant messages, or any other suitable electronically-conveyed message. Messages may include any digital information (e.g., text, graphics, audio, video, commands, executable code, data, etc.) that it is desired to convey electronically between senders and recipients.

Users may communicate with each other using equipment 12. Equipment 12 may, for example, include computing equipment such as a personal computers, portable computers, workstations, mainframe computers, networked computers or terminals, handheld computers, or any other suitable electronic equipment. Multiple individuals or organizations may use the same device. For example, a group of workers in an office may share the use of a single computer terminal that is connected to a host computer in a local area network.

The equipment of FIG. 1 may be interconnected by communications paths in communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

System 10 generally has multiple IBE private key generators 16. Each IBE private key generator 16 may be associated with a different set of users. An IBE private key generator and its associated users is called a "district." In a typical scenario, a large organization may have multiple districts. For example, one district may be used for securing communications with members of the organization's sales force. Another district may be used for securing communications with the organization's managers. Districts need not be mutually exclusive. For example, a manager in the sales department may be a member of both of this organization's districts.

Various computing devices may be used with network 14 to support secure messaging features. For example, computing equipment may be used to implement the functions of a server or other computer equipment at each IBE private key generator 16. Servers may also be used to support the functions of an IBE public parameter directory, an IBE public parameter host, a certificate authority, mail servers, and other entities. Such servers may be co-located with a sender, may be connected to the network 14 as an independent third-party service, may be part of the infrastructure of network 14, may be associated with a given recipient's organization, may be co-located with the recipient, private key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is sometimes referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic message may be sent. For clarity, the present invention is generally described in the context of email messages. This is merely illustrative. Any suitable type of messages may be conveyed between senders and receivers if desired.

Some user activities in system 10, such as sending person-to-person email messages, involve at least some manual intervention. For example, a person who desires to send a personally-composed text message must type the message before it is encrypted and sent to the appropriate recipient. Other user activities in system 10 may be entirely automated so that no human intervention is generally required. As one example, the user at one device 12 may be a banking institution that desires to use encrypted email communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated. System functions involved in presenting on-screen options for humans to respond to (e.g., by clicking on them using a computer mouse) can be automated using software running on the components of the system. Situations where a particular function may involve manual intervention or a computer-implemented operation will be clear from context in the following discussion.

During operation of system 10, certain entities (e.g., private key generators such as private key generator 16) may need to verify that a given party has permission to access the contents of a particular message or to perform certain functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties. Digital signatures (e.g., signatures from a certificate authority or other entity that use PKE private keys and that can be verified using matching PKE public keys) may be used to ensure that a message or other signed information is associated with a particular party.

Sometimes authentication information and other information (in addition to the messages being sent from the senders to the recipients in system 10) such as IBE public and private keys must be conveyed between parties securely (e.g., between a sender and a private key generator or between equipment associated with a recipient and a private key generator, etc.). A number of different approaches may be used to convey information in system 10 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., because the communications path is physically under the control of a trusted party), and information may be conveyed securely by encrypting the information (e.g., in a message) before sending it over an insecure (or secure) link.

The operation of system 10 may involve the use of traditional public-key-encryption cryptographic techniques such as used with RSA public-key cryptography. For example, the secure sockets layer protocol, which may be used to secure communications between parties when a web browser or other application is used, involves the use of certificates from trusted certificate authorities. Digital signatures can also be implemented using traditional public-key-encryption techniques. These traditional public key cryptographic techniques are referred to herein as "PKE" cryptographic techniques.

The operation of system 10 also uses identity-based-encryption (IBE) cryptographic techniques. These cryptographic techniques are referred to herein as "IBE" cryptographic techniques.

PKE and IBE encryption schemes use an asymmetric approach. Some information (so-called public key information) is used to encrypt data. Other corresponding information (so-called private key information) is used to decrypt the encrypted data.

To enhance the efficiency of the IBE decryption and encryption processes, "two-step" decryption techniques may be used in which a message key (e.g., a symmetric message key) is used to encrypt the contents of a message prior to transmission to the recipient. The IBE process may then be used to encrypt the symmetric message key. The message that is sent from the sender to the recipient contains the IBE-encrypted message key and the message-key-encrypted message contents. At the recipient, the recipient can use the IBE private key to decrypt the message key. The message key may then be used by the recipient to decrypt the rest of the message. These two-step processes may be more efficient than "pure" or "single step" IBE encryption algorithms in which the IBE algorithm alone is used to encrypt the entire message. Both types of approaches (and analogous multi-layer IBE encryption approaches) are generally referred to herein as simply "IBE" schemes for clarity.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001). See also http://eprint.iacr.org/2001/090 by Dan Boneh and Matthew Franklin. With the approach described in the work of Boneh and Franklin, IBE encryption is based on the properties of bilinear maps such as a Weil Pairing or Tate Paring. For clarity, aspects of the present invention will sometimes be described in the context of an identity-based-encryption scheme such as the elliptic curve implementation described by Boneh and Franklin. This is, however, merely illustrative. Any suitable approach for IBE encryption may be used with system 10 if desired.

Initially, when the system is set up, IBE private key generators (e.g., IBE private key generators such as IBE private key generator 16 of FIG. 1) each obtain or generate a master secret s. For example, each private key generator may create a master secret from a number that is randomly generated at the private key generator by a processor housed inside a tamper-proof enclosure. The master secret may also be produced off-site and delivered to the private key generator 16.

The master secret (also sometimes referred to as a secret master key or a master key) is secret information that is used by the private key generator 16 to generate private keys. In an environment in which a message may be encrypted to a particular individual recipient, the recipient's private key can be used to decrypt the encrypted message. In an environment in which a message is encrypted to an associated entity (e.g., the recipient's organization), the private key associated with the organization can be used to decrypt the message.

After the master secret s has been obtained, the private key generator may use the master secret in generating IBE public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The IBE public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been determined, the IBE private key generator 16 may make this information available to senders in system 10. The public parameter information may be provided to the senders using any suitable technique. For example, recipients may send the public parameter information to senders in email messages or use other suitable peer-to-peer distribution schemes. If desired, the private key generator 16 may publish the public parameter information by using a directory service or by placing the public parameter information on a particular host server that a sender can reach using an associated domain name or other suitable service name that is generated based on the recipient's public key (e.g., using a known service-name generation rule). These are merely illustrative techniques for making the public parameter information available to users in system 10. Any suitable technique for making the public parameter information available to the users may be used if desired.

If the public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance (e.g., P may be built into user software) and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the public parameter information (e.g., public parameters P and sP) has been provided to a user (i.e., a sender) who desires to send an encrypted message to another user (i.e., a recipient), the sender may encrypt and send the message to the recipient. An IBE encryption engine 18 implemented on the sender's equipment may be used to encrypt the message. The IBE encryption engine 18 may use the public parameter information (e.g., P and sP) and an appropriate IBE public key to encrypt the message. For example, the IBE encryption engine may encrypt the message using the IBE public key associated with the recipient.

When the IBE-encrypted message is received, the IBE private key that corresponds to the IBE public key is used to decrypt the message. The IBE private key is generated by the IBE private key generator 16. An IBE decryption engine may be used to decrypt the IBE-encrypted message. The IBE decryption engine takes as inputs the IBE-encrypted message and the IBE private key and produces the unencrypted version of the message as an output. In the illustrative configuration of FIG. 1, an IBE decryption engine 20 is shown as being located at the recipient 12. As described in more detail below, when the recipient is associated with an organization, the organization may have a gateway that uses decryption engine 20 to decrypt IBE-encrypted messages before performing message processing functions such as virus scanning and spam filtering. The decrypted message may then be securely provided to the recipient (e.g., by re-encrypting the message using IBE or other suitable encryption scheme, by forwarding a retained copy of the original IBE-encrypted message, by transmitting the message to the recipient over a secure path, etc.)

The IBE encryption engine 18 and decryption engine 20 may use software to implement the desired IBE encryption and decryption algorithms. Engines 18 and 20 may be provided to equipment in the system as part of the software applications used by senders and recipients (e.g., email messaging software), as part of the message management software provided to organizations in system 10, as a downloadable program or plug-in that is available to senders, recipients, and organizations in system 10, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by or based on that recipient's email address, name, or social security number. An advantage of using IBE encryption is that a sender can generally determine the identity (e.g., the email address) of an intended recipient without the complexities that would be involved in obtaining the PKE public key of the intended recipient with traditional PKE schemes such as the RSA cryptographic scheme. For example, the IBE public keys may be the same as or based on user email addresses, which are readily obtainable.

Each IBE private key generator generally has multiple associated users. An IBE private key generator may generate an IBE private key for each of its associated users based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003- Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

When a validity period is used as part of an IBE public key Q, it is not permissible to access the contents of a message encrypted using that Q if the current date does not fall within the specified validity period. This policy may be enforced by the private key generators. If the current date is not within the validity period specified in the public key, a private key generator will refuse to generate and provide an otherwise authorized key requester (e.g., a message recipient or authorized agent for the message recipient) with a copy of the corresponding private key that is needed to decrypt the message. With this approach, private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com|top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information and additional criteria may be used if desired.

A sender may send an IBE-encrypted message to multiple recipients. For example, a sender may send a message to a list of distinct email addresses, each associated with a different recipient each of which has a different IBE private key. In this type of scenario, the sender encrypts the message sent to each recipient differently (i.e., using the appropriate IBE public key for each intended recipient).

A sender desiring to send an IBE-encrypted message should have information sufficient to construct the IBE public key Q of the intended message recipient. This information may include information on an individual recipient's identity (e.g., an email address), information on how to construct the IBE public key Q from suitable access policy information (e.g., validity period, security level, subscription level, content rating, geographic region, etc.), or any other suitable identity information and/or generally-applicable access policy information that specifies which parties are allowed to access the contents of the message and under what conditions such access is permitted.

The sender must also obtain the public parameter information (e.g., P and sP) associated with the intended recipient of the message prior to message transmission.

Once the sender has the IBE public key of the recipient and the appropriate corresponding public parameter information, the sender may use the IBE encryption process (e.g., the process of the work of Boneh and Franklin described above) to encrypt the message contents for the recipient. The IBE process may be implemented using software at the sender's equipment such as IBE encryption engine 18. The encryption engine 18 may be a stand-alone process or application or may be incorporated into another process or application (e.g., as part of an email application, as a function in an operation system, in a virus scanning or spam-blocking application, as part of a firewall, etc.). A user process or application (whether stand-alone or multi-function) that uses IBE for message encryption may be referred to as a user's "client" software or "client." The IBE encryption engine 18 may take as inputs (1) the message to be encrypted, (2) the IBE public parameter information (e.g., P and sP), and (3) the IBE public key Q. The IBE process implemented using the IBE encryption engine 18 produces an encrypted version of the message as its output.

A sender may transmit an IBE-encrypted message to a recipient using an email program or other suitable software. After the sender transmits the IBE-encrypted message to the recipient over communications network 14, the recipient may receive the message. The recipient may decrypt the received message using an appropriate IBE private key. The recipient may use decryption engine 20 to decrypt the message. The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only the appropriate private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

A recipient's authorization to access the contents of a message may be verified using authentication information (credentials) from the recipient and using other information (e.g., independently-gathered information on the current date). The private key generator 16 may use the access policy embodied in the IBE public key (in conjunction with optional additional policy criteria) to determine whether a given recipient is authorized. Once the IBE private key generator 16 verifies that the recipient is authorized to access the message contents, the private key may be generated and issued to the recipient by the IBE private key generator 16.

If desired, the IBE private key generator 16 and the recipient may use intermediate parties as agents during the process of providing recipient credentials, verifying the recipient's authorization to access the message content, and providing the IBE private key. Any suitable manual or automatic authentication technique may be used by the IBE private key generator 16 to verify that the recipient (or the recipient's agent) is authorized to receive the IBE private key prior to issuing the recipient's private key.

Regardless of how the IBE private key generator 16 determines that the recipient is authorized to obtain the IBE private key, the private key should be provided to the recipient or an appropriate agent of the recipient for use in decrypting the message. Any suitable technique may be used to provide the IBE private key to the recipient or agent. For example, the private key may be transmitted to the recipient or agent in an email or other suitable message or may be made available for downloading over the Internet or a local area network (as part of a stand-alone downloadable application or a downloadable plug-in module, as a stand-alone key, etc.). A secure communications channel may be used for electronic communications between the IBE private key generator 16 and the recipient's or agent's equipment. If desired, an IBE private key may be preinstalled, so that the private key will be available for the recipient or agent when the recipient or agent first uses IBE. The private key may also be distributed by mail or courier (e.g., on a computer-readable medium such as a computer disk or memory chip).

The recipient or recipient's agent may, if desired, store the private key locally (e.g., in a cache or database on a storage device such as a memory circuit or hard drive on the recipient's equipment). If the private key is stored locally (and has not expired or otherwise become obsolete), the recipient or agent can retrieve it the next time a message needs to be decrypted without contacting the IBE private key generator 16 to obtain a new copy of the IBE private key over the communications network.

The IBE private key need not be stored. If the private key is not stored locally, the recipient or agent need not manage a cache or database of keys, which may help to reduce system complexity. The recipient or agent will also be assured that a valid current version of the IBE private key will be generated in real time by the IBE private key generator when a key request is fulfilled. In systems in which Q's are based on both identity information and validity-period or other date-sensitive information, the value of Q for a given recipient is continually being updated as the date and time change. Generation of private keys sQ in real time therefore helps to ensure that the correct up-to-date version of Q is used to form the IBE private key sQ.

The sender or the sender's agent may cache public parameter information on the sender's equipment (or on equipment at an agent of the sender) or may obtain the IBE public parameter information in real time.

Figure 2:
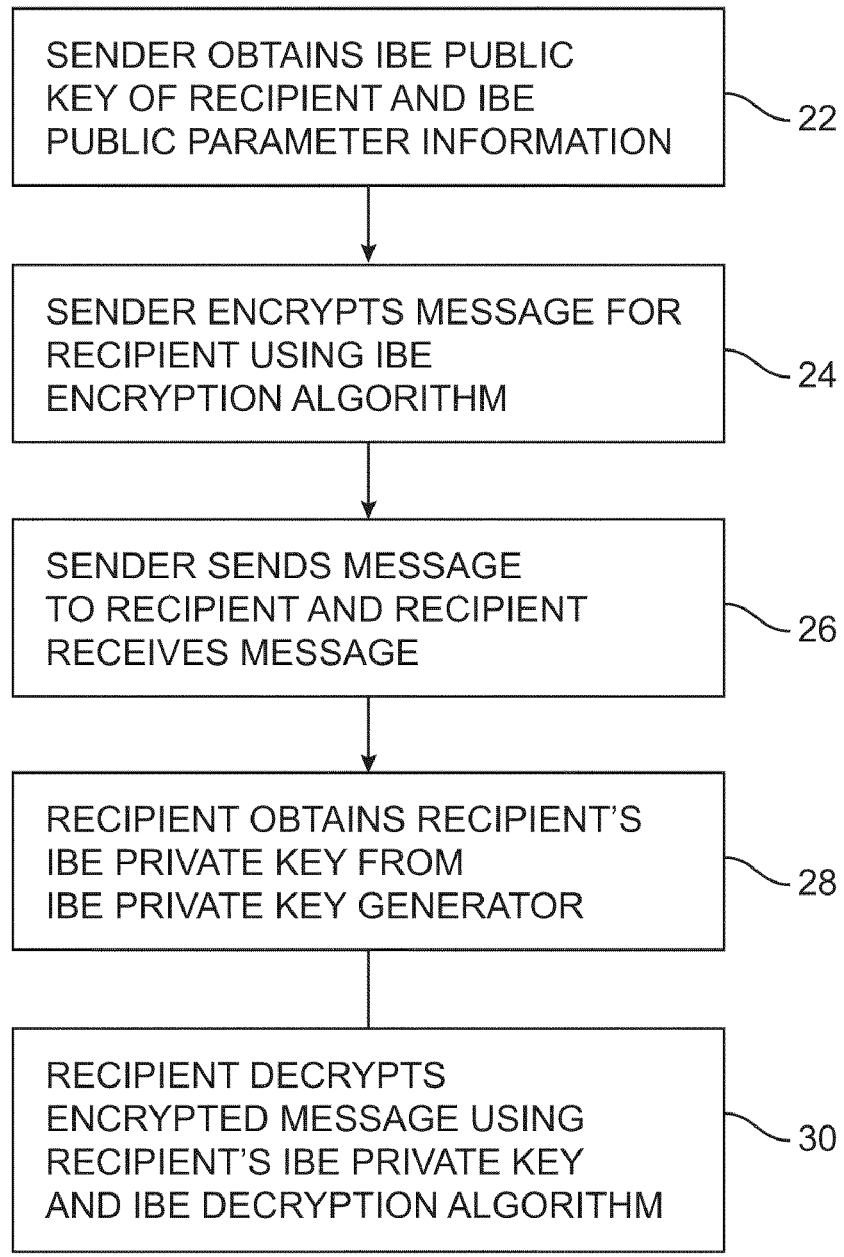
FIG. 2 is a flow chart of illustrative steps involved in using identity-based-encryption techniques to support secure messaging in accordance with the present invention.

Illustrative steps involved in using IBE-encryption to convey a secure message from a sender to a recipient in system 10 are shown in FIG. 2. At step 22, the sender (or sender's agent) may obtain the IBE public key Q of the intended recipient and the associated IBE public parameter information (e.g., parameters P and sP). The IBE public key Q may be obtained from a source that has a copy of the appropriate IBE public key Q or may be generated based on known rules (e.g., by obtaining the recipient's email address or other identity information, by determining a suitable validity period or other generally-applicable access policy information, and by using this information to generate Q). The IBE public parameter information may be obtained from the recipient or other suitable party, may be obtained over network 14 from a directory service (e.g., a directory service implemented on a server connected to network 14), or may be obtained over network 14 from a host associated with the IBE private key generator 16 that generated the public parameter information. The IBE public key Q and IBE public parameter information may be cached locally by the sender for later retrieval if desired. If desired, Q may be generated in real time. For example, Q may be generated in real time to incorporate up-to-date validity period information into Q in addition to identity information such as recipient email address information.

At step 24, the sender or sender's agent may use IBE encryption engine 18 (FIG. 1) to encrypt a message for the recipient.

The IBE-encrypted message may be sent to the recipient over network 14 and received by the recipient at step 26. The message may be accompanied by information on the IBE public key Q that was used to encrypt the message. This information may be used by the recipient or recipient's agent in determining which private key generator 16 to contact at step 28 and which private key to request to decrypt the message.

To obtain the IBE private key from the private key generator at step 28, the recipient or recipient's agent may provide information on Q (e.g., Q, a precursor of Q, or a derivative of Q) to the private key generator that the private key generator can use to determine which private key is being requested (and which access policies apply). The recipient or recipient's agent can provide the private key generator with recipient credentials such as username and password information, biometric information, age information, and other suitable identity and authentication information that the private key generator 16 may use to verify that the recipient or recipient's agent is authorized to obtain the requested IBE private key.

If desired, certain access policies may be implicit. Moreover, the private key generator may use its own information (e.g., information on the current time and date) as well as information provided by the recipient or recipient's agent in determining whether or not a given recipient or agent is authorized to obtain the IBE private key. During the authentication process, the recipient, agent, and the IBE private key generator may communicate using secure communications (e.g., using PKE-encrypted messages, a trusted communications path, a secure communications link such as an SSL or TLS link, etc.).

When the private key generator 16 determines that the recipient or agent is authorized to obtain a copy of the IBE private key, the IBE private key may be generated and provided to the recipient or agent securely at step 28 (e.g., in a secure message or over a secure communications link in network 14).

At step 30, after the recipient or agent has obtained the appropriate IBE private key, the recipient or agent may use this private key with decryption engine (FIG. 1) to decrypt the encrypted message. If the recipient's agent decrypts the message, the recipient's agent can securely provide the unencrypted version of the message to the recipient (e.g., over a secure or trusted link) or can re-encrypt the message or retrieve a temporarily-stored encrypted version of the message and transmit it to the recipient in encrypted form for decryption by the recipient.

Whenever computer equipment is connected to an open network such as the Internet, there is a risk of infection by computer viruses and attacks by unauthorized users. Email systems are susceptible to unwanted commercial solicitations (spam). Sometimes security and policy issues are raised when members of an organization try to send unencrypted messages containing sensitive information or try to access potentially objectionable content over the Internet. These problems can be addressed using tools such as firewalls, web browser filtering software, and mail processing services.

For example, a content filter for a web browser may be used to prevent access to web pages containing undesirable content. The content filter may examine web pages for potentially objectionable text. If potentially objectionable text is located in a web page requested by a user's web browser, the filter can prevent the user's browser from displaying the requested page.

Firewalls can block access to a computer or network based on access rules. For example, a firewall can be used to prevent passage of Internet Protocol (IP) packets into an organization's network unless the headers of those packets contain port and destination address information that matches a predetermined port and destination address (e.g., the port and destination address associated with the organization's mail server). Firewalls can be used to restrict both incoming and outgoing traffic.

Message processing applications can be used to enforce email policies. As an example, a virus scanning message processing application may scan incoming and/or outgoing email messages for viruses. This type of message processing application may examine email for attachments containing executable code or executable code with particular properties. A spam-filtering message processing application may block undesirable unsolicited commercial email messages based on message header information such as subject-line information, sender address information, or other message content or attributes. An email policy-enforcement message processing application may enforce email security policies. For example, such a message processing application may block certain unencrypted outgoing messages when those messages are sent to particular recipients, are sent by certain senders, or contain sensitive information.

The message management functions of these various types of message processing applications can be provided using a single message processing application or multiple message processing applications. These functions can be provided using any type of software process (i.e., application-level software and/or functions provided by a computer operating system) running on any type of computing equipment or hardware. For clarity, message processing application functions are generally described as being provided by "mail processing applications" or "message processing applications." This is, however, merely illustrative. Any suitable software implemented on any suitable computing equipment platform may be used to provided these services if desired.

Figure 3:
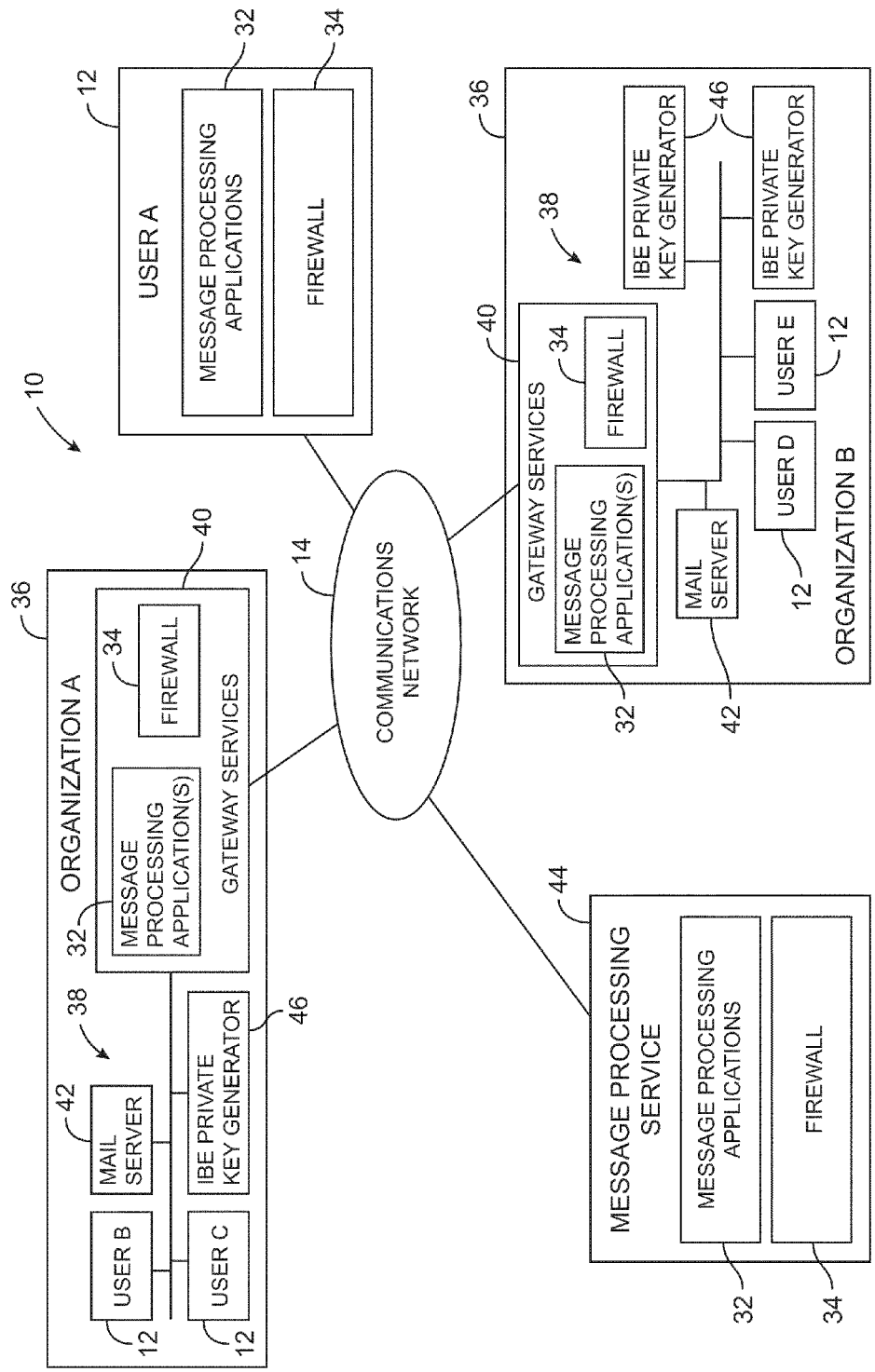
FIG. 3 is a diagram of an illustrative identity-based encryption system with IBE message management capabilities in accordance with the present invention.

A diagram showing how message processing applications 32 may be used in system 10 is shown in FIG. 3. A user who is not associated with a particular organization (i.e., user A) may have a firewall 34 and message processing applications 32 such as antivirus and antispam software applications running on a personal computer or other suitable computing equipment 12.

In an organizational context, message processing applications 32 may be implemented on a gateway (e.g., one or more servers or other computing equipment at the edge of the organization's network that serves to control data flowing into and out of the organization). A firewall 34 and other gateway services 40 such as web content filtering, etc. may also be used to control the flow of information into and out of the organization.

In the example of FIG. 3, organizations 36 have their own internal networks 38. Networks 38 may be local area networks (e.g., for smaller organizations) or wide area networks (e.g., for larger or more geographically distributed organizations). Each network 38 typically contains one or more mail servers such as mail servers 42. Incoming email messages may be delivered to users in an organization by placing the email messages on the mail server 42. Each user's client software can then retrieve that user's email from the mail server 42, thereby completing the mail delivery process. Communications network 14 (e.g., the Internet) also contains mail servers (e.g., mail servers associated with various users' and organizations' Internet service providers). These mail servers are used to convey email between users in system 10 over network 14.

Organizations 36 may use message processing applications 32 to regulate email flowing between their users 12 and communications network 14. The message processing applications 32 may be used for virus scanning, spam filtering, security policy enforcement, etc.

If desired, an organization may subscribe to a third-party message processing service such as message processing service 44. When an organization subscribes to this type of third-party service, email messages that are addressed to the organization are diverted to the message processing service 44. After message processing, the messages are forwarded to the organization for delivery to their original intended recipients. Message diversion may be accomplished by changing database information in the DNS servers in network 14 to redirect email that is addressed to the organization's users to the message processing service 44. The message processing service 44 may maintain a database of subscriber email address information. Following message processing, email may be forwarded to the proper recipients using information from this database.

During message processing by message processing service 44, the message processing service 44 (which may use a firewall 34) may run message processing applications 32 on a server or other computing equipment. This equipment is generally remote from the subscribing organization's location. The message processing applications 32 of the message processing service 44 can be used to perform the same types of message processing that is performed using locally-implemented message processing applications 32 in an organization (e.g., virus scanning, spam filtering, email policy enforcement for security policies and other policies, etc.). An organization may use an application service provider such as the third-party message processing service 44 to relieve the organization from some or all of the responsibilities for processing email messages.

Regardless of whether the message processing applications 32 are used at an individual user's equipment 12, an organization 36, or message processing service 44, the message processing applications 32 may be used to regulate both the transmission and reception of email. Message processing applications 32 may be used at the sender, the recipient, or both the sender and recipient.

As an example, if a sender such as user B at organization A desires to send an email message to a recipient such as user D at organization B, the message may be processed by both the message processing applications 32 of the sender's organization's gateway services 40 and the message processing applications 32 of the recipient's organization's gateway services 40. The outgoing email from organization A may (as an example) be screened to determine whether it contains sensitive content. If the email contains sensitive content, the message processing applications 32 may use an IBE encryption engine such as IBE encryption engine 18 (FIG. 1) to encrypt the outgoing email. At organization B, the gateway services 40 of organization B may receive the IBE-encrypted email for user D. The message processing applications 32 may use an IBE decryption engine such as decryption engine 20 (FIG. 1) to decrypt the IBE-encrypted email from user B. Following decryption, the message processing applications 32 at organization B may perform virus scanning and spam filtering on the email. The email may then be securely transmitted to user D.

Organizations may have IBE private key generators 46 (like IBE private key generator 16 of FIG. 1) for generating IBE private keys for associated users. For example, organization A may have an IBE private key generator 46 that is used to generate IBE private keys for all of the users in organization A. Some organizations may have multiple IBE private key generators. For example, organization B may have one IBE private key generator 46 that is used to generate IBE private keys for users in its sales force and another IBE private key generator 46 that is used to generate IBE private keys for its managers. An IBE private key generator 46 and the users associated with that IBE private key generator (i.e., users who obtain IBE private keys from that IBE private key generator) form a "district." Districts need not be mutually exclusive. For example, some of the members of the sales force in organization B may be managers and may therefore belong to two districts in organization B. If desired, information on the district to which a message is encrypted may be transmitted with the message. This may facilitate the decryption process at the recipient's organization.

Figure 4:
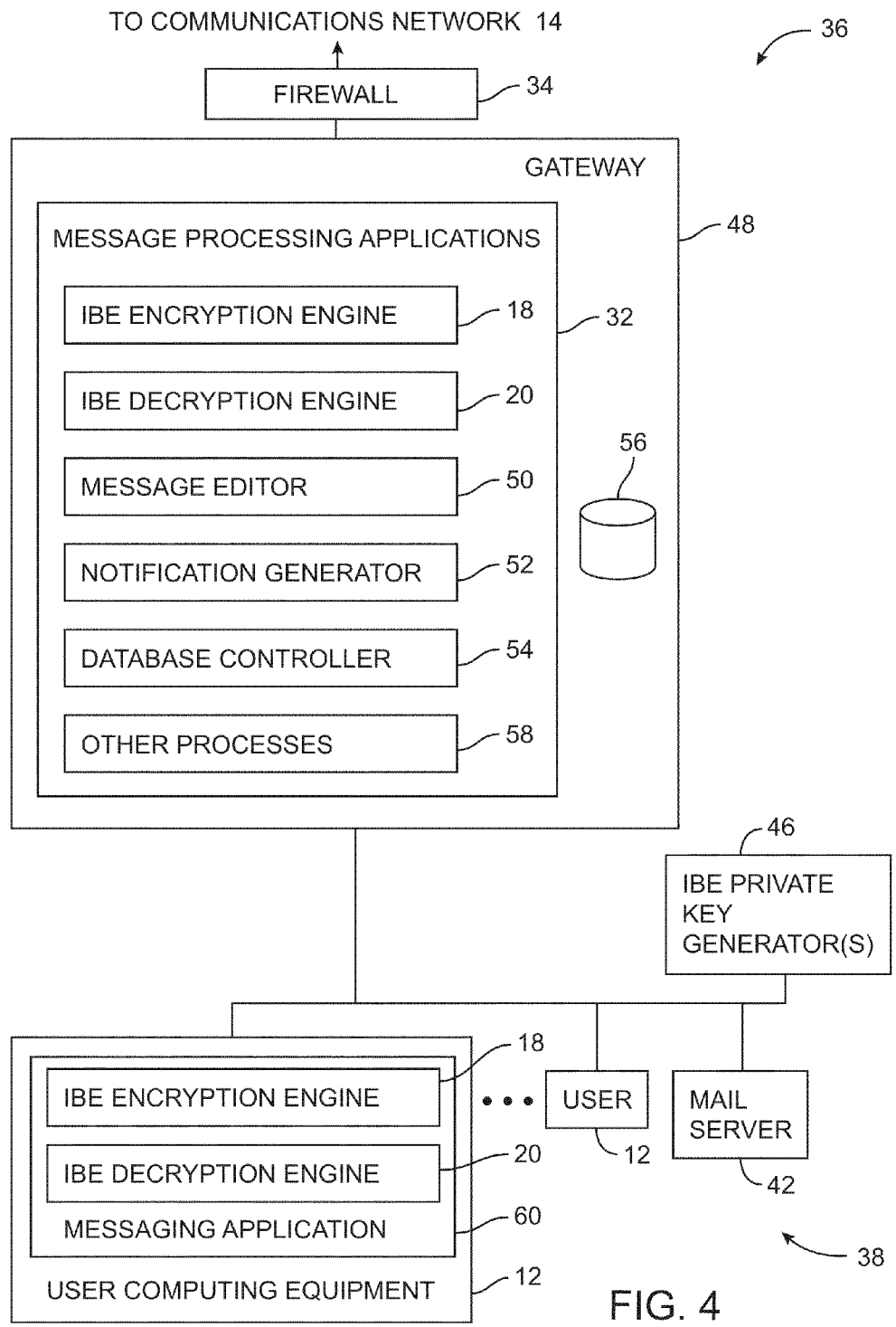
FIG. 4 is a diagram showing illustrative message management system components that may be used at to provide IBE message management functions an organization in accordance with the present invention.

Illustrative message processing applications (processes) that may be used in system 10 are shown in more detail in FIG. 4. In the example of FIG. 4, message processing applications 32 are shown as being installed on a gateway 48 at an organization 36. This is merely illustrative. The same types of message processing applications 32 can be used by message processing service 44 and users such as user A of FIG. 3 that are not part of an organization.

As shown in FIG. 4, the gateway 48 may be connected to communications network 14 (FIGS. 1 and 3) via firewall 34. Firewall 34 may be used to implement access rules (typically based on port and address information). Firewall 34 can help to prevent unauthorized access to resources in network 38. For example, firewall 34 can ensure that only email traffic reaches mail server 42, etc. Firewall 34 may also be used to control outbound activities.

If incoming communications satisfy the firewall access rules, these communications may be passed to gateway 48. Gateway 48 may be implemented using one or more servers or other suitable computing equipment. By loading and running message processing applications 32 on gateway 48, gateway 48 can be configured to perform the steps necessary to implement desired message processing functions.

Message processing applications 32 may include IBE encryption engine 18 and IBE decryption engine 20 and other suitable encryption and decryption services (e.g., for PKE encryption and decryption). IBE encryption engine 18 may be used, for example, when encrypting a sensitive outgoing email message to conform with an organizational security policy. IBE encryption engine 18 may also be used to encrypt incoming email messages before those messages are delivered to recipients within the organization 36. If other secure communications arrangements are available within the organization (e.g., if an SSL or TLS link can be established between gateway 48 and a recipient user 12 or if other message encryption or link security measures are in place within the organization), such additional arrangements may be used in addition to or in place of using IBE to secure internal communications.

Message editor 50 may be used to edit messages. As an example, message editor may be used to delete portions of the text of an email message. If an outgoing message contains potentially sensitive information, the sensitive information may be blocked or replaced by less sensitive information. For example, a sensitive term may be automatically replaced by a code name. As another example, potentially objectionable content in an incoming or outgoing message may be replaced by text stating "content blocked." If a virus is detected in an email attachment or if email attachments are not permitted by the organization (in either incoming or outgoing messages), message editor 50 may be used to remove the attachment.

Message editor 50 may be used to edit any suitable message attribute, such as message header information, message body information, or message attachment information.

As an example, message editor 50 may be used to change the destination of a message. If an outgoing message appears to violate a particular organizational policy, the message editor 50 may, as an example, reroute the message to an administrator by editing the destination address. Message editor 50 may also be used to edit the cc or bcc entry in an email header if it is desired to send a copy of the message to an administrator or other suitable personnel at the organization or other entity. The subject line of an email may be altered or blocked. For example, message editor 50 may add text to the subject line that indicates that the message has been screened for viruses.

Message body information such as text and graphics in the main portion of an email message may be edited by message editor 50 when, for example, sensitive content or potentially objectionable material is detected. As an example, the sensitive or objectionable content may be removed or replaced with a notice such as "content removed."

Message attachments may be removed or altered using message editor 50. For example, all executable files or all detected viruses may be stripped from incoming or outgoing messages.

Notification generator 52 may be used to alert an administrator or other suitable party. For example, if an outgoing email violates an organizational policy (e.g., because it contains a sensitive internal document as an attachment), a notification message may be sent to an appropriate party that identifies the policy violation and the name of the sender.

Database controller 54 may be used to save copies of messages or portions of messages (e.g., attachments, text or graphics in the message body, or headers) and to perform other message management functions requiring data storage in a database 56. As an example, database controller 54 may be used to retain a copy of an encrypted incoming message, so that this encrypted version of the message can later be forwarded to the intended recipient within an organization. As another example, database controller 54 may be used to manage the archiving of all messages containing a particular type of content or all messages sent to a particular domain, etc. Database controller 54 may be used to retain copies of certain types of messages for a particular period of time to ensure regulatory compliance.

These are merely illustrative types of processes that may be used to process messages in system 10. Other processes (applications) 58 may be used to process messages if desired. Moreover, the message processing applications 32 of FIG. 4 may be used in any suitable combination. For example, a virus scanning program that handles incoming messages may include message processing components such as IBE decryption engine 20, message editor 50, notification generator 52, and database controller 54. The IBE decryption engine 20 may be used to decrypt IBE-encrypted email before virus detection operations. The message editor 50 may be used to remove attachments containing viruses. The notification generator 52 may be used to generate an alarm for an administrator when a virus is detected. The database controller 54 may be used to save a copy of the offending message following virus detection.

As another example, a regulatory compliance application may be used to examine outgoing messages. When an outgoing message is detected that contains a certain type of data (e.g., patient data or other medical data in the health-care field) or when it is determined that an outgoing message has originated with a particular sender (e.g., a physician) or is destined to a particular recipient (e.g., a patient), the regulatory compliance application may encrypt and archive the message. The regulatory compliance application may include components such as IBE encryption engine 18 to encrypt the message, notification generator 52 to remind the sender of the relevant organizational policy, and database controller 54 to handle the archiving of the message.

Another example concerns unsolicited commercial email (spam). Mail processing applications 32 may include an antispam program. The antispam program may decrypt encrypted messages and block those messages that appear to be spam. The antispam application may include an IBE decryption engine 20 for decrypting incoming messages that have been encrypted using IBE. The antispam application may also include a message editor 50 that edits the destination address to block the email or to divert the offending messages into a suitable repository.

As demonstrated by these examples, mail processing applications 32 include a number of different processes or components which may be used in one or more combinations that need not be mutually exclusive. Moreover, some of these processes may also be implemented on user equipment 12 in addition to gateway equipment 48 (or the equipment of message processing service 44). As an example, a messaging application such as an email program or other user client 60 may include an IBE encryption engine 18 and IBE decryption engine 20. The client 60 may use IBE encryption engine 18 to encrypt messages to be sent securely to gateway 48 (as an example). IBE decryption engine 20 may be used to decrypt IBE-encrypted messages.

Network 38 may include one or more mail servers such as mail server 42. The client software 60 on each user's equipment may automatically send transmitted email messages to mail server 42. Gateway 48 may process outgoing messages destined to be sent to users over communications network 14 by periodically obtaining these messages from mail server 42. Incoming messages that have been processed by message processing applications 32 may be directed to mail server 42. The user client 60 of each user may be configured to automatically retrieve that user's mail from an appropriate mail server 42. These types of arrangements may be used to support communications between users 12 and gateway 48, without requiring that each user's equipment be powered up continuously and without requiring gateway 48 to implement the functions of a mail server (although such an arrangement may be used if desired.).

Figure 5:
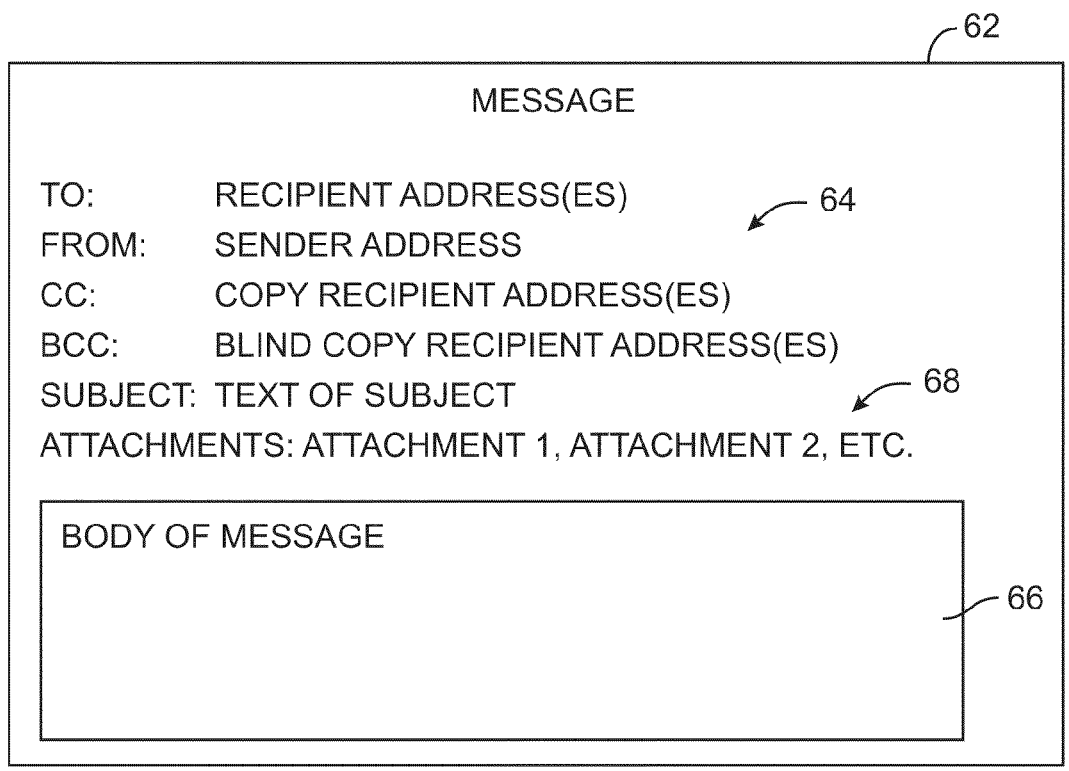
FIG. 5 is a diagram of an illustrative unencrypted message.

An illustrative unencrypted email message 62 is shown in FIG. 5. As shown in FIG. 5, an email message 62 may contain header information 64 such as recipient and sender address information and copy recipient address information. The header 64 may also contain a subject line. Message body 66 may contain text and/or graphics. Attachments 68 may be image files, text files, music files, video files, computer code, or any other suitable data or combinations of these items.

Figure 6:
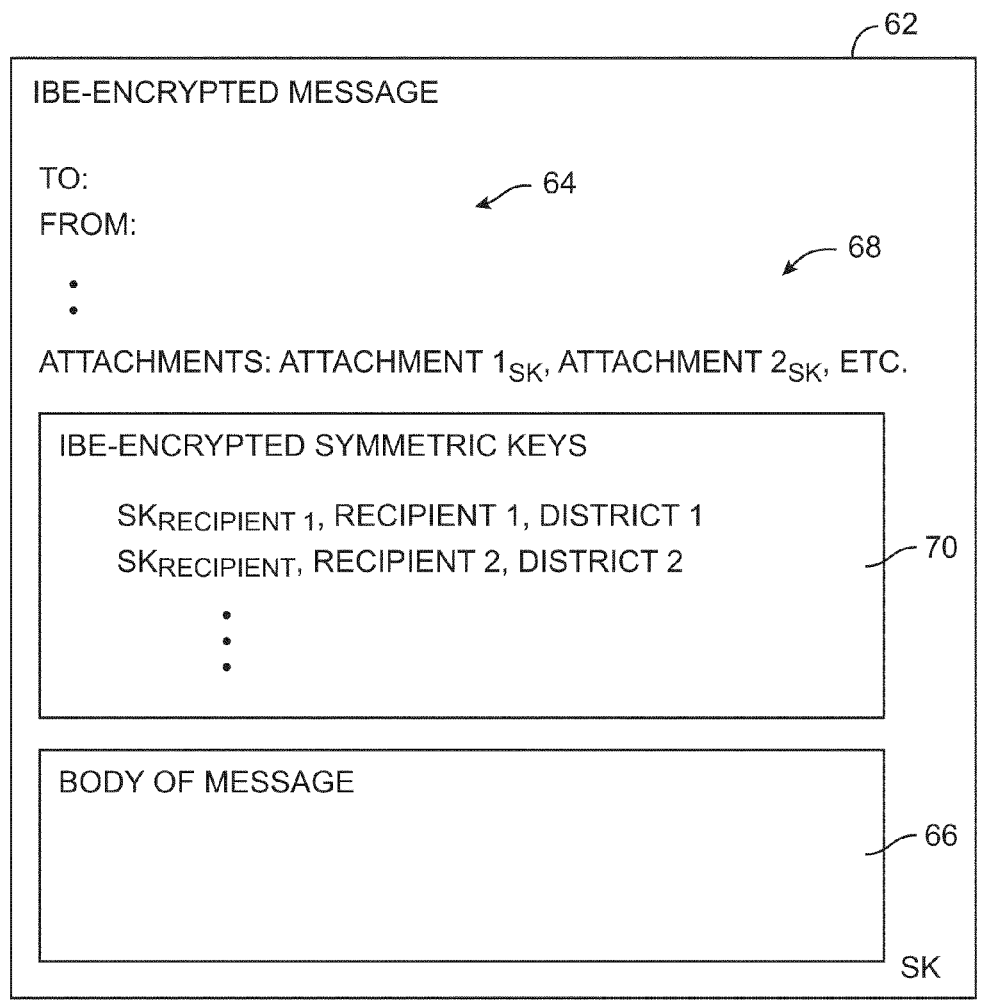
FIG. 6 is a diagram of the illustrative message of FIG. 5 after IBE encryption in accordance with the present invention.

After a message of the type shown in FIG. 5 has been encrypted using an IBE encryption engine, the message may contain information of the type shown in FIG. 6. As shown in example of FIG. 6, the message body 66 and message attachments 68 of message 62 may be encrypted using a message key SK such as a symmetric message key. The message key SK may be generated by the sender of the message (e.g., randomly) and need not be known ahead of time by the recipient or recipients of the message. To provide the recipient or recipients with the message key in a secure fashion, the message key may be encrypted using IBE. A copy of the IBE-encrypted message key may be included in message 62 for each recipient of the message. The resulting list 70 of one or more IBE encrypted message keys 70 is shown in FIG. 6.

As shown by the subscripts "RECIPIENT1, RECIPIENT2, . . . " the message keys are IBE-encrypted using the identities Q of the recipients.

The list 70 of IBE-encrypted message keys may also include recipient and district information (i.e., the information "RECIPIENT1 and DISTRICT1 for the first illustrative entry in list 70 of FIG. 6). The recipient and district information may be used to help a recipient or recipient's agent in locating and contacting the correct IBE private key generator 46 when requesting a copy of the recipient's IBE private key to decrypt the IBE-encrypted message key for that recipient. The recipient and district information may be provided using any suitable format. For example, recipient information may be provided in the form of the IBE public key that is used to encrypt messages to the recipients, etc. District information may be provided in the form of a domain name or other service name that identifies the service (server) on which the IBE private key generator is located. Once the proper IBE private key has been obtained, the IBE-encrypted message key SK can be decrypted and used to decrypt the message attachments and body of the message.

Figure 7:
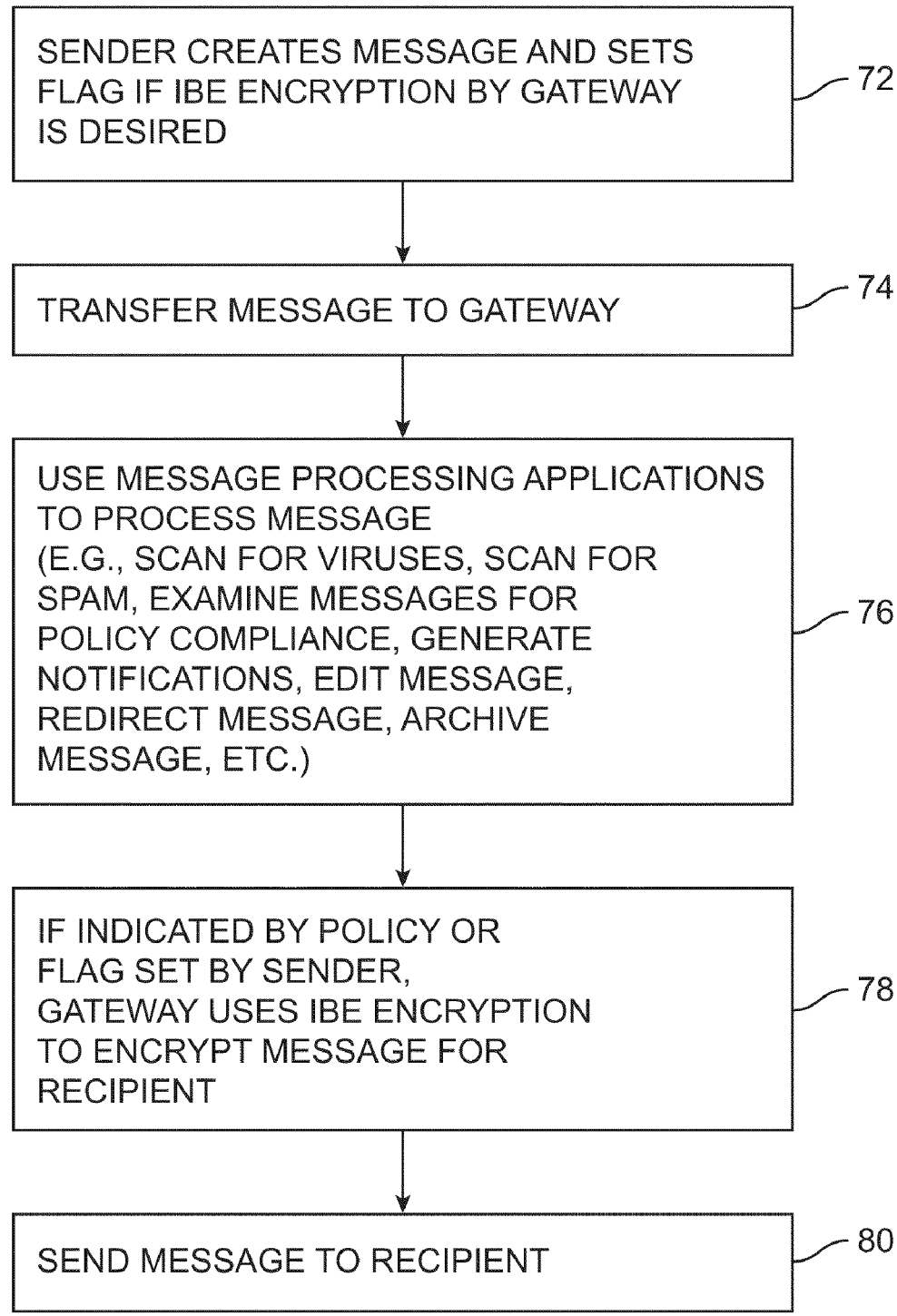
FIG. 7 is a flow chart of illustrative steps involved in sending a message to a recipient through an IBE message management system at a sender's organization in accordance with the present invention.

Illustrative steps involved in using system 10 to send a message 62 though a gateway at a sender's organization 36 or user equipment 12 are shown in FIG. 7. At step 72, a sender may create a message to be sent. The message may be encrypted by the sender using an IBE encryption engine 18 using public parameter information and the value of Q for the recipient. If Q is based on the recipient's email address concatenated with a validity period, for example, Q can be constructed in real time by the sender's client before it is used to encrypt the message.

Because many organizations require that outgoing messages be subject to inspection by the message processing applications 32 at the organization's gateway 48, senders in some organization may not be permitted to encrypt messages at the desktop using IBE. Rather, senders may send IBE-encrypted messages to outside recipients by informing the message processing applications 32 of the organization that a given message is to be encrypted using IBE. Any suitable technique may be used to inform the message processing applications of which messages are to be encrypted. For example, the sender's client application may automatically set a flag or other suitable indicator associated with the message. Information indicating that the sender desires to have the message processing applications 32 encrypt the message using IBE may be included in the header of the message, in the message body, or in the message attachments. Information indicating that the sender desires to have the message processing applications 32 encrypt the message using IBE may also be provided to the message processing applications 32 separately (e.g., using a separate communications path or separate message or notification, etc.).

The message may be transferred to the gateway 48 at step 74 (e.g., using one or more mail servers 42).

At step 76, the message processing applications 32 may be used to process the outgoing message. For example, the message processing applications 32 may perform virus scanning to detect viruses in the message attachments or other portions of the message. The message processing applications 32 may also examine the content of the message to determine if the message contains potentially objectionable content or has other content or attributes that require encryption or that require other special actions to be taken (e.g., archiving, message rerouting, editing, etc.). The message processing applications can examine any suitable portions of the message and may use external information (e.g., information on the current date and time, information on the recorded sending habits of the sender, information about certain recipients, etc.) in determining what actions should be taken with respect to the message. Illustrative actions (processing functions) that may be taken include editing the message, blocking the message, filtering out portions of the message, creating alarms or other notifications, archiving the message, and sending copies of the message to certain recipients.

One of the actions that may be taken by the message processing applications 32 during message processing is to encrypt the message. In particular, the message processing applications 32 may IBE-encrypt the message using IBE encryption engine 18. The message may be encrypted whenever a message processing application detects that a flag has been set by the sender that requests IBE encryption be performed on the message or whenever the message processing application receive other suitable information from the sender indicating that the sender desires that the message be encrypted using IBE. The message processing applications 32 may also automatically encrypt certain messages using IBE based on attributes of the message such as message body contents, message attachment status or contents, message recipient address information, message sender address information, etc.

Whether indicated by a message processing application policy or by information provided explicitly by the sender's client, at step 78, the message processing applications on the gateway can use IBE encryption engine 18 to encrypt the message for the recipient. To encrypt the message, the message processing applications 32 may obtain the IBE public key of the recipient (Q) and public parameter information (e.g., P and sP). The public parameter information may be obtained from the Internet (e.g., from a public parameter host server). The value of the recipient's IBE public key Q may be generated in real time using known IBE public key generation rules (e.g., by concatenating validity period information with the email address of the recipient).

If desired, an encrypted message from the sender's equipment (e.g., a message encrypted using IBE) can be passed through the message processing applications 32 without decryption and examination of the encrypted contents. In this situation, the message processing applications 32 can forgo policy enforcement to determine whether the message should be encrypted, because the message is already encrypted.

The message processing applications 32 can also process unencrypted portions of the message (e.g., message header information such as address information and subject line information) even if the message has been IBE-encrypted at the sender and has not been decrypted at the gateway prior to processing by the message processing applications. The message processing applications 32 can also decrypt the encrypted message for processing and then forward a retained encrypted version or re-encrypted version of the message to the recipient. When IBE encryption is used with this type of approach, the message processing applications 32 must have access to the IBE private key corresponding to the IBE public key that was used by the sender's client to encrypt the message. Access to the necessary IBE private key can be obtained when the IBE public key that was used to encrypt the message belongs to or is associated with the gateway itself, rather than the intended downstream recipient. The IBE re-encryption process performed by the message processing applications 32 following message processing may use the IBE public key of the recipient. During the re-encryption process, the message processing application can generate the IBE public key of the recipient in real time (e.g., by concatenating a validity period with recipient email address information, etc.).

To ensure the integrity of the message, it may be desirable to provide the message from the sender to the message processing applications 32 over the organization's network 38 in a secure fashion. One illustrative way to convey the message from the sender to the message processing applications 32 securely is by allowing the sender to use IBE to encrypt the message using the IBE public key of the message processing applications 32 (gateway 48). The message can also be encrypted using PKE. Encryption of the message can be avoided if the communications path between the sender and the messaging application is trusted (e.g., because a protocol such as SSL or TLS is used to ensure the security of the link, because the link is physically secure, etc.).

If the sender is not at an organization (i.e., the sender is a user such as user A of FIG. 3), the sender's message processing applications can scan for viruses or perform other suitable actions before using IBE encryption engine 18 to encrypt the outgoing message. Because no gateway is needed in this situation, the sender's message processing applications and client software can perform the necessary message processing steps and IBE encryption for the recipient without encrypting or securing communications between the sender's equipment and a gateway.

At step 80, following processing by the message processing applications 32, the message (e.g., a message that has been encrypted using IBE or an unencrypted message) may be sent through the optional firewall 34 of the sender's organization to the recipient over network 14.

Figure 8:
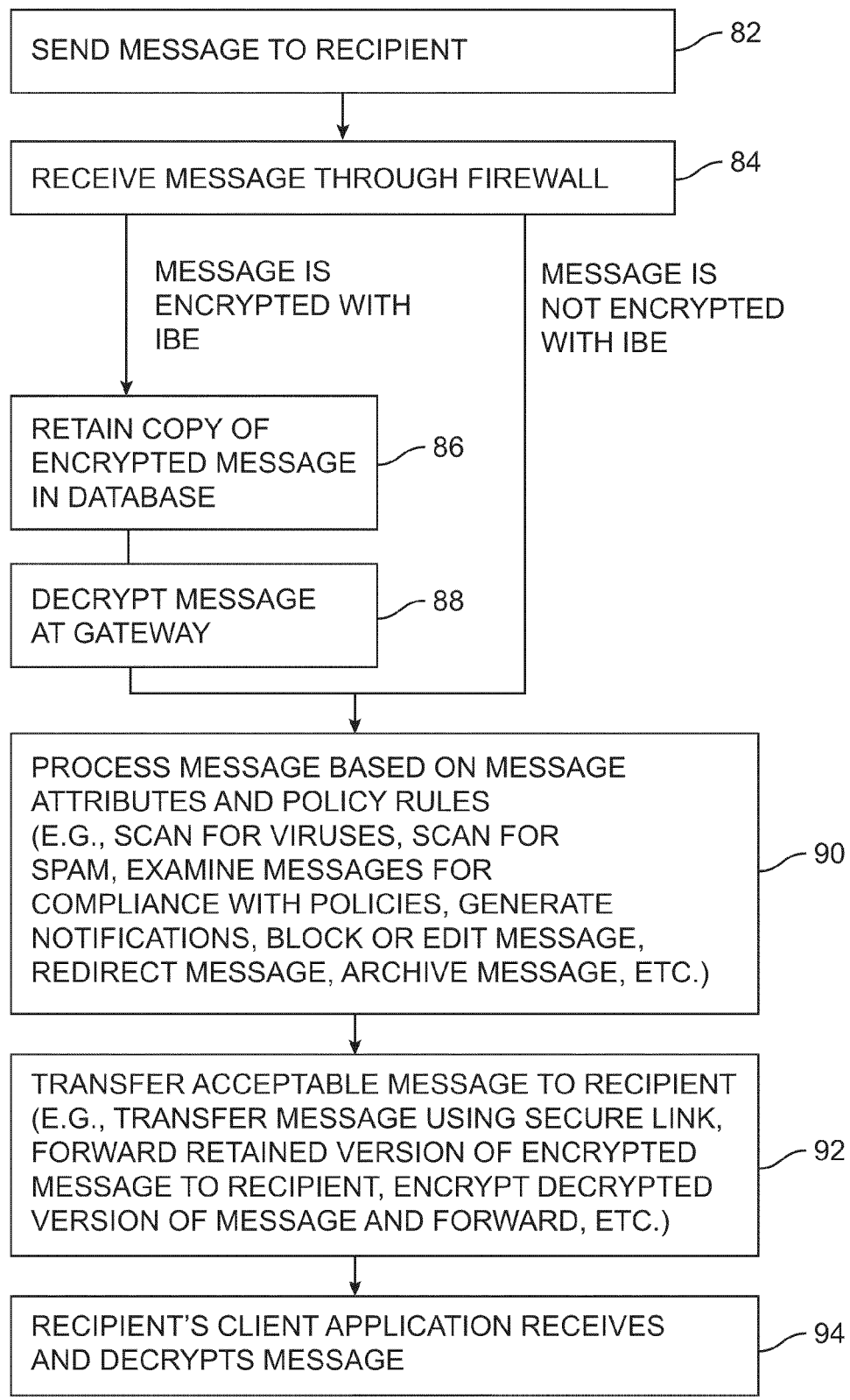
FIG. 8 is a flow chart of illustrative steps involved in receiving a message for a recipient at an organization with an IBE message management system in accordance with the present invention.

Illustrative steps involved in receiving incoming email messages through the message processing applications 32 at an organization or a user's equipment are shown in FIG. 8. At step 82, a message is sent by a sender. The sender may be a user such as user A of FIG. 3 that is not associated with an organization or may be a user such as user B of FIG. 3 who is part of an organization. The message may be encrypted using IBE or may be unencrypted. IBE-encrypted messages may be created by obtaining the IBE public key of the recipient and the IBE public parameter information for the recipient's district and by using this information with IBE encryption engine 18 to encrypt the message.

At step 84, the message may be received over network 14 by the recipient's organization (or by the recipient's equipment if the recipient is not associated with an organization). If a firewall is in use, the message may be received through the firewall.

If the message is encrypted with IBE, a copy of the IBE-encrypted message may, at step 86, optionally be retained in database 56 (FIG. 4) by the message processing applications. By retaining the encrypted version of the message, it is not necessary to re-encrypt the message following message processing.

The IBE-encrypted message may be decrypted by the message processing applications 32 using the IBE decryption engine 20 at step 88. To decrypt the message, the gateway requests and obtains the IBE private key for the recipient in real time from the appropriate IBE private key generator 46.

At step 90, the unencrypted version of the message that was received through the firewall at step 84 or the unencrypted version of the message that was produced during the decryption process of step 88 may be processed using the message processing applications 32 at the recipient's gateway. (If the recipient is not associated with an organization, the recipient's message processing applications can obtain the recipient's IBE private key from an appropriate IBE private key generator over network 14 and can then use the IBE private key to decrypt the IBE-encrypted message. Additional desired processing operations such as virus scanning, spam filtering, notifications, archiving, etc. may be performed on the decrypted message and the resulting decrypted and processed version of the message may be provided to the recipient.)

When the recipient is associated with an organization, the message processing of step 90 may involve virus scanning, spam filtering, security policy enforcement and enforcement of regulatory policies and other policies. The message processing may also involve message editing, the generation of alerts or other notifications, message archiving or redirection to appropriate personnel at the recipient's organization, etc.

At step 92, after the message has been processed at the gateway 48, the message may be provided to the recipient over the local area network 38 or wide area network 38 of the organization. The message may, for example, be provided to the recipient via one or more mail servers 42 that are part of the network 38. If desired, secure protocols such as SSL and TLS may be used to secure the communications paths used during message distribution to the recipient. The message may also be provided from the gateway to the recipient securely by using a communications path that is trusted because it is physically secure or by encrypted the message to the recipient at the gateway (e.g., using IBE or PKE techniques). If IBE encryption is used to secure the message for the recipient, the message processing applications 32 can either re-encrypt the message using the IBE encryption engine 18 of the message processing applications or can forward the original IBE-encrypted version of the message that was retained at step 86.

At step 94, the recipient may receive the message from the gateway. For example, an email application or other client software on the recipient's equipment may be configured to periodically query the mail server 42 to retrieve the recipient's email. If the message obtained from the gateway via the mail server is IBE-encrypted, the recipient's client software may use its associated IBE decryption engine 20 to decrypt the message and present its contents to the recipient.

If desired, a notification-based delivery process may be used during step 94 to provide the email message from the gateway to the recipient. With this type of approach, the recipient may be notified (e.g., in an email message or other notification) when a message is available for viewing (e.g., after the message processing applications 32 have finished message processing). The gateway may store the message on a server (e.g., at the gateway or other suitable location on the network 38). The notification message for the recipient may include a web link or other suitable clickable option that the recipient can respond to. When the recipient clicks on the link or option button, the recipient's web browser or other client software is launched and taken to an appropriate download page/screen. The recipient can then interact with displayed information to view the message (e.g., in a web browser window) or to otherwise complete the viewing/delivery transaction.

Figure 9:
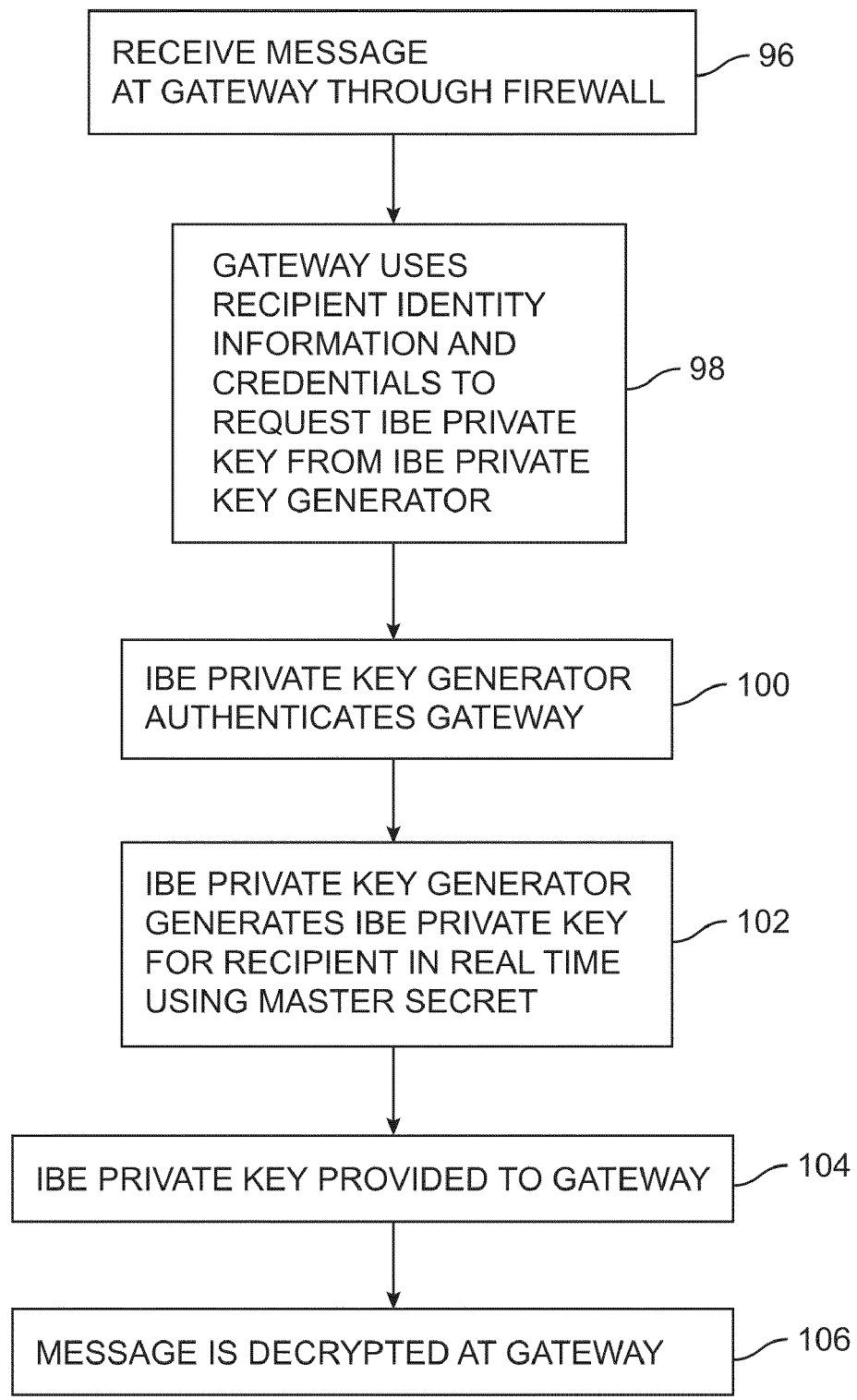
FIG. 9 is a flow chart of illustrative steps involved in decryption of an IBE-encrypted message at the recipient's organization before performing message processing operations on the message in accordance with the present invention.

Illustrative steps involved in the IBE decryption process of step 88 of FIG. 8 are shown in FIG. 9. After a message has been received by the gateway 48 through the firewall (step 96 or step 84 of FIG. 8), the gateway may, at step 98, use information on the identity of the intended recipient of the message to request a copy of the IBE private key from the appropriate IBE private key generator 46. Recipient identity information may be obtained, for example, from the header of the email message or IBE public key information Q provided with the message in a list such as list 70 of FIG. 6. Information on the district to which the recipient belongs may also be obtained from the email message (e.g., from a list such as list 70 of FIG. 6). The message processing applications 32 can use the district information to contact the correct IBE private key generator. The message processing applications and gateway can present the recipient's credentials or other suitable information to the IBE private key generator 46 when requesting the IBE private key for the recipient.

Any suitable technique may be used to allow the message processing applications to obtain the recipient's private key. For example, if username and password authentication techniques are used by the IBE private key generator to authenticate users, the username and password information for each of the recipients at the organization may be maintained by the message processing applications 32 at the gateway for use when requesting IBE private keys. As another example, credential information may be obtained by the gateway from the recipient in real time. If desired, a ticket or other electronic token or information may be used by the gateway to prove that the message processing applications are authorized to obtain the recipient's IBE private key.

The gateway 48 may use its own credentials (i.e., gateway credentials) when requesting private keys from the IBE private key generator 46. In this type of arrangement, the gateway and processing applications work as a proxy for the recipient. As an example, the gateway may authenticate to the private key generator using an identity such as secure_gateway@company.com when requesting keys. In this scenario, the private key generator knows that this "user" is allowed to request any key (or at least a wide range of keys) and provides the requested key accordingly.

Regardless of which arrangement is used by the message processing applications 32 to prove to the IBE private key generator 46 that the message processing applications 32 are authorized to obtain the IBE private key for the message recipient, at step 100, this arrangement is used by the IBE private key generator 46 to authenticate the message processing applications 32 and gateway 48.

Once the message processing applications 32 have been authenticated by the IBE private key generator 46, the IBE private key generator 46 generates the IBE private key for the recipient in real time at step 102 using the master secret s (e.g., by computing sQ).

The IBE private key that is generated at step 102 may be provided to the message processing applications 32 at the gateway at step 104. For example, this information may be provided over network 38 using a secure link such as a SSL or TLS link, over a link that is trusted because it is physically secure, or in a secure message.

At step 106, the IBE private key may be used by the decryption engine 20 in the message processing applications 32 on the gateway 46 to decrypt the message.

Figure 10:
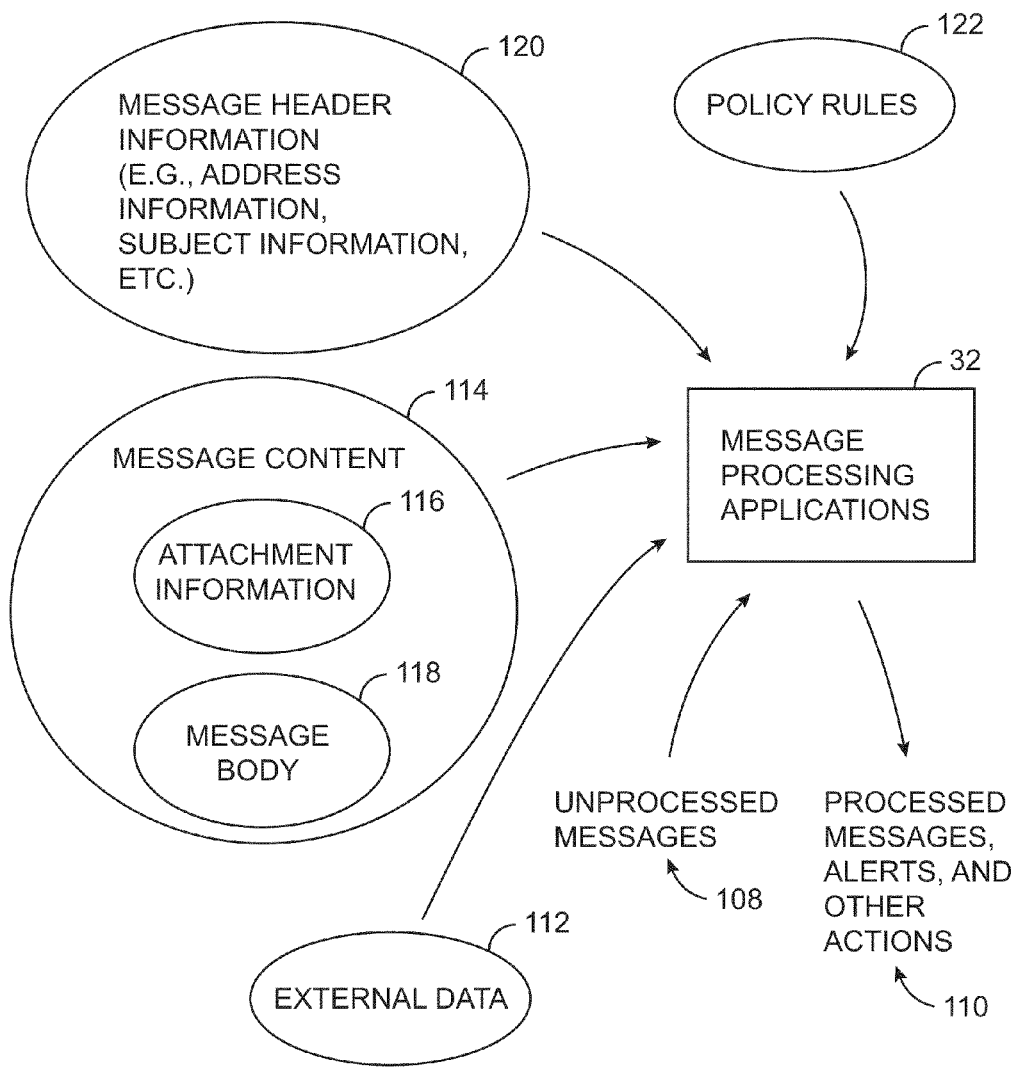
FIG. 10 is a diagram showing how message processing applications may process messages based on message attributes and policy rules in accordance with the present invention.

The diagram of FIG. 10 shows how message processing applications 32 may process unprocessed messages 108 to produce processed messages and to produce notifications and take other suitable actions 110. Any suitable information may be used by the message processing applications 32 in processing the messages. For example, external data 112 may be used by the message processing applications 32. Such external data may, for example, include information on the current time and date, information on the location of the message processing applications, information of the organization or other entity who is using the applications, etc. The message processing applications 32 may also examine message attributes when determining how to process a given message. For example, the message processing applications may examine message content 114 such as attachment information 116 and message body information 118. Message attribute information may also include message header information 120 such as information on addresses and subject information. If a message is encrypted, the header or message content may include a list such as list 70 of FIG. 6 that contains encrypted message keys for each recipient and associated recipient (public key) and district information. Such recipient and district information and encrypted message keys may also be used as inputs by the message processing applications 32.

In processing the unprocessed messages 108, the message processing applications 32 may implement policy rules 122. Policy rules 122 may include default rules (e.g., rules that are built into the IBE cryptographic algorithm being used) and rules that are adjustable or selectable (e.g., by a system administrator). As an example, a system administrator may direct the message processing applications 32 to reject all incoming email from a particular sending address. As another example, the system administrator may instruct the message processing application 32 to require that all message sent to a particular destination address or containing particular types of content in the attachments 116 or body 118 be encrypted using IBE. Policies 122 may include policies on how to detect and treat viruses, policies related to blocking spam, security or encryption enforcement policies, policies related to content filtering, etc. These policy rules 122 determine what types of processed messages are produced during message processing, what types of notifications are produced, when and how the message is to be edited or archived, which messages are to be encrypted, and how other actions are to be taken.

Figure 11:
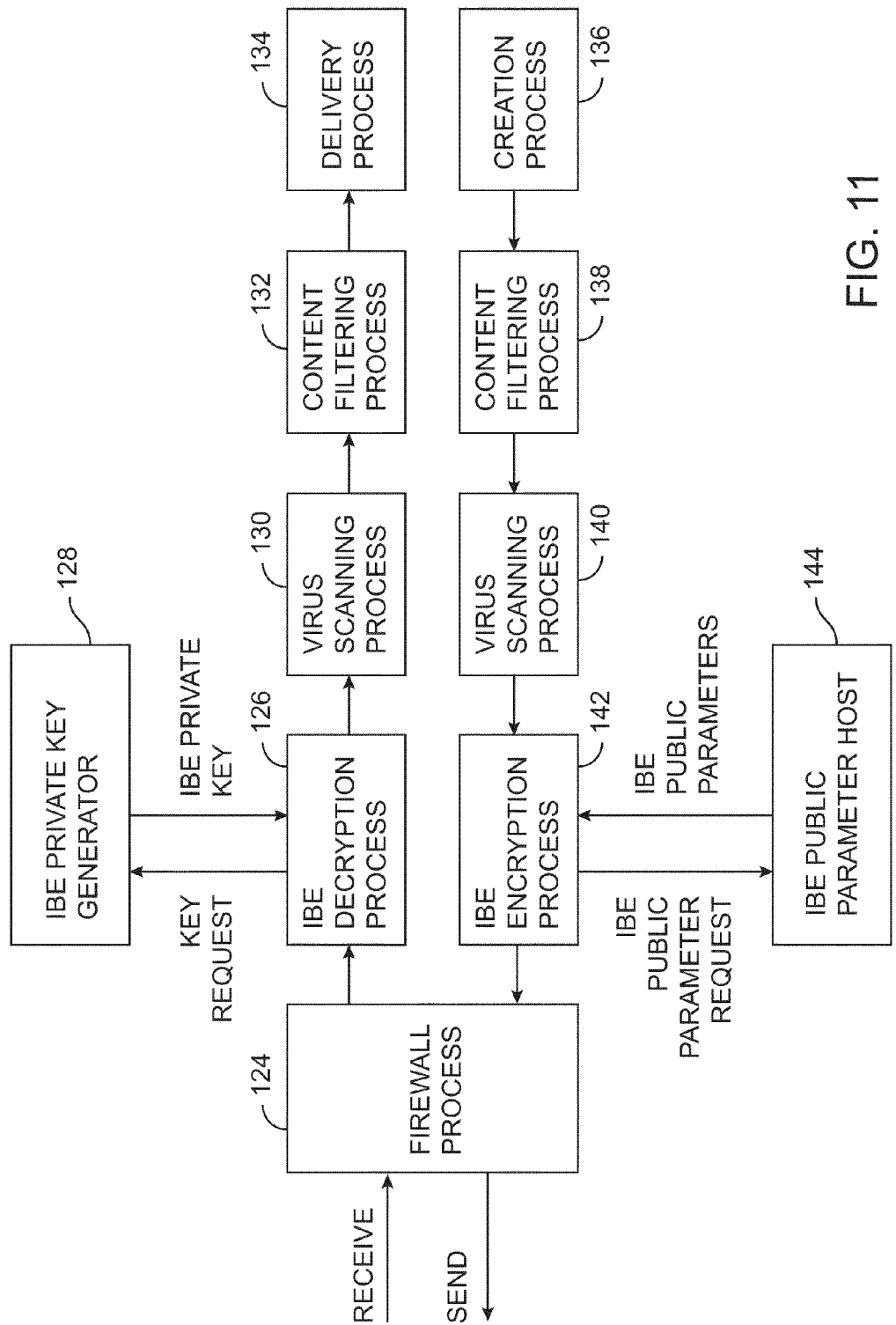
FIG. 11 is a diagram showing the operation of an illustrative IBE message management system with virus scanning and content filtering capabilities in accordance with the present invention.

If desired, the message processing applications 32 may be provided in the form of software packages such as a firewall application, encryption and decryption processes, and virus scanning and content filtering (spam-blocking) processes. An illustrative arrangement of this type is shown in FIG. 11. As shown in FIG. 11, an incoming message may first be handled by firewall process 124. Firewall process 124 may, for example, block incoming messages unless the IP packets that make up those messages contain appropriate address and port information.

IBE decryption process 126 may receive incoming messages from firewall process 124. The IBE decryption process 126 may obtain recipient information from the message. This information may be the IBE public key of the recipient Q or may be used to construct the IBE public key of the recipient Q. Using this information and other information such as district information that is obtained from the message and using recipient credential information such as a username and password, a ticket, etc., the IBE decryption process 126 can authenticate to the IBE private key generator 128 during a key request process.

In response to a valid request for the recipient's IBE private key, IBE private key generator 128 generates the IBE private key of the recipient and provides it to IBE decryption process 126. IBE decryption process 126 uses the IBE private key to decrypt the IBE encrypted message. The unencrypted version of the message is then passed to virus scanning process 130. If the message from firewall process 124 was initially unencrypted, the IBE decryption process 126 can pass the unencrypted message to virus scanning process 130 directly.

The virus scanning process 130 can scan the unencrypted version of the message for viruses. After processing by virus scanning process 130, a spam blocking application or other content filter process 132 may be used to determine whether or not to block or edit the message based on its contents or other attributes.

After processing by content filter process 132, the message may be delivered to the recipient by delivery process 134.

Outgoing messages can be created using an email editor or other suitable message creation process 136. The messages may be left in unencrypted form so that processes such as processes 138 and 140 can operate on the unencrypted contents of the messages.

Content filter process 138 may be used to examine the content of the message and to block or redirect messages based on their content.

Virus scanning process 140 may be used to scan outgoing messages for viruses. After scanning, the outgoing message may be provided to IBE encryption process 142. If desired, all messages leaving an organization (or other user site) may be encrypted using IBE encryption. Alternatively, messages may be selectively encrypted. For example, messages may be encrypted by IBE encryption process 142 whenever a message is determined to contain sensitive content or to be destined to a particular address, etc. Messages may also be encrypted whenever encryption is requested by the sender (e.g., when the creation process 136 sets an indicator or otherwise instructs the IBE encryption process to encrypt the message before transmission out of the organization).

During IBE encryption, the IBE encryption process obtains the IBE public parameters for the intended message recipient. The IBE encryption process 142 may, for example, formulate an IBE public parameter request using known rules. The IBE public parameter request may be provided to a suitable IBE public parameter host 144 which responds by providing the IBE public parameters to the IBE encryption process 142.

After IBE encryption by process 142 (if desired), the outgoing message may be sent over an external network 14 through firewall process 124.

If the message processing applications that are used for implementing message management services are used by an organization, the system components of FIG. 11 other than IBE public parameter hosts for recipients outside of the organization are generally located within the organization's network 38. If the message processing applications are used by an individual sender or recipient who is connected to the Internet through a mail server operated by their Internet Service provider, the IBE private key generator 128 and IBE public parameter host 144 may be located remotely and the remaining components of FIG. 11 may be implemented locally on the individual's equipment.

In system environments in which the services of a third party message management service are used, message processing applications 32 can be run on servers or other suitable equipment at the message management service. For example, the message management service may use a firewall process 124, IBE decryption process 126, virus scanning process 130, and content filtering process 132 of the type shown in FIG. 11. IBE private key generator 128 may be located remotely or at the message management service. IBE public parameter hosts such as host 144 are generally at remote locations and are not located at the message management service. A delivery process may be used by the message management service when forwarding processed emails to the organization who subscribes to the services of the message management service. Although outgoing mail need not be handled by the message management service, if desired, such outgoing message processing may be handled using processes 138, 140, and 142 after a message has been created at the organization subscribing to the third-party message management service using creation process 136.

Figure 12:
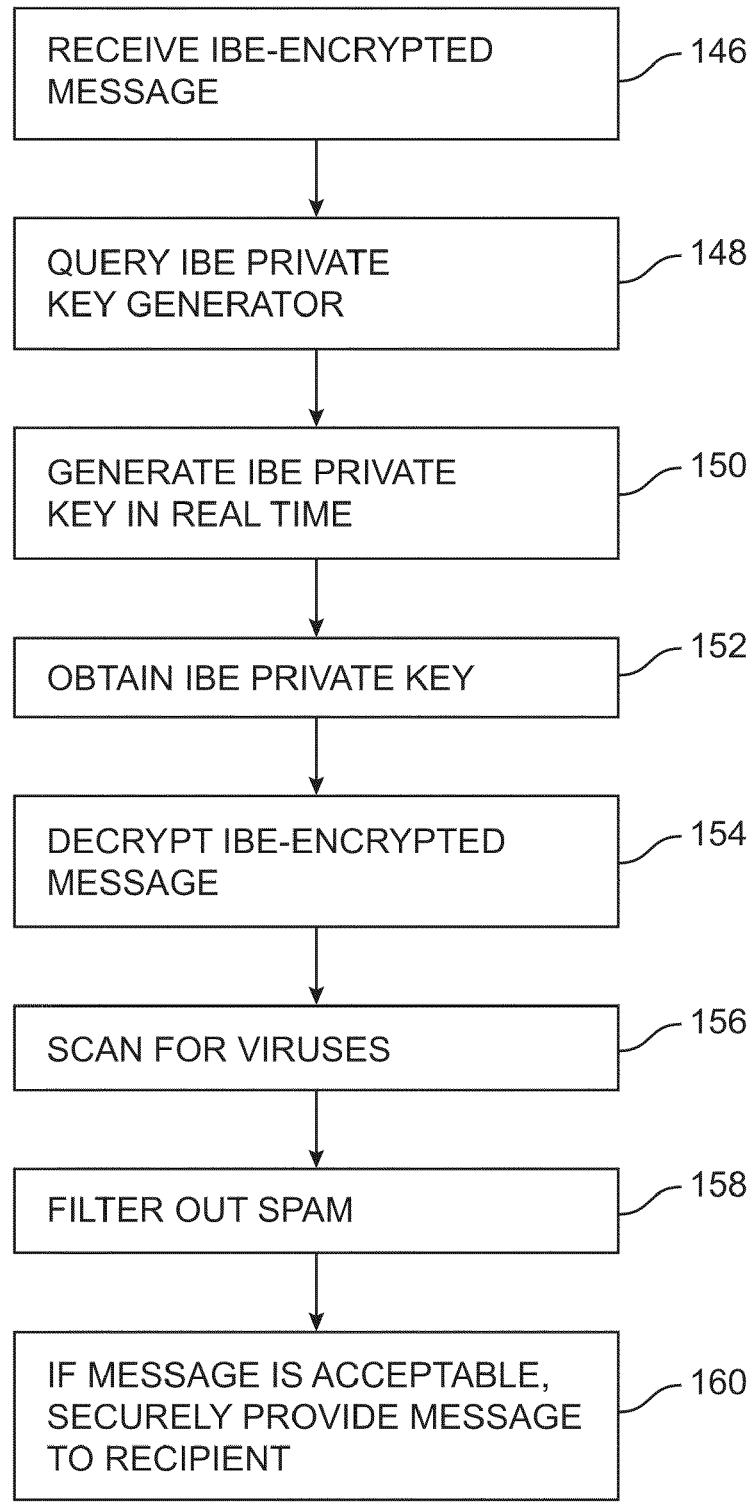
FIG. 12 is a flow chart of illustrative steps involved in using the system of FIG. 11 to perform virus scanning and content filtering operations on IBE-encrypted messages in accordance with the present invention.

Illustrative steps involved in using an arrangement of the type shown in FIG. 11 to handle incoming messages that have been encrypted using IBE are shown in FIG. 12. At step 146, an IBE-encrypted email message may be received by IBE decryption process 126 though firewall process 124.

At step 148, the IBE decryption process 126 may use information on the recipient's identity and/or the recipient's IBE public key Q to request a corresponding IBE private key from the IBE private key generator 128. If there are multiple IBE private key generators available, the IBE decryption process may use information on the recipient's district to locate and query the appropriate IBE private key generator. During the key request process, the IBE decryption process uses recipient credential information to prove to the IBE private key generator 128 that the IBE decryption process is authorized to obtain the IBE private key for the recipient. The recipient credential information may be provided in any suitable format, such as username and password information, biometric information, information derived from a hardware token in the control of the recipient, a ticket or other suitable token or information that serves as recipient credential information, etc.

After the IBE decryption process 126 has successfully completed the authentication process, the IBE private key generator 128 generates the IBE private key for the intended recipient of the message at step 150 in real time.

At step 152, the IBE decryption process 126 obtains the IBE private key from the IBE private key generator 128.

At step 154, the IBE decryption process decrypts the encrypted message using the IBE private key.

At step 156 virus scanning process 130 may be used to scan the unencrypted version of the message for viruses. Any suitable virus scanning process (software package) may be used to examine the message for possible viruses at step 156. The virus scanning process 130 may operate on any suitable aspect of the message such as the body of the message, the message attachments, or message header information and may apply any suitable virus detection criteria. As an example, the virus scanning process 130 may compare executable code associated with the message to known virus signatures. If a match is detected, the virus scanning process can block the message and generate an alert. The output of the virus scanning process 130 is a scanned version of the unencrypted message.

At step 158, antispam filtering and other suitable content-based filtering may be applied to the scanned and unencrypted version of the message using content filtering process 132. Content filtering process 132 may, as an example, examine the source address of the message or attempt to detect other message attributes that are associated with unsolicited commercial email.

Although virus scanning is performed before content filtering of incoming messages in the example of FIG. 11, the order of virus scanning, content filtering, and other message processing steps is generally not critical. Spam filtering or other content filtering processes may be performed before virus scanning of incoming message if desired. An advantage of scanning for viruses at an early stage is that this may help to reduce the risk of damage from a virus.

If the message does not contain viruses and has not been blocked by the content filtering process 132, the message may be provided to the recipient by the delivery process 134 at step 160.

Senders of messages (or a gateway associated with a sender) will generally use IBE encryption to encrypt messages to recipients. With this approach, the IBE public key of the ultimate downstream recipient (e.g., a particular individual at an organization) is used to encrypt the message. For example, if a recipient has an email address of user@company.us.com, the value of Q that is used to encrypt the message may include the full string user@company.us.com. At the receiving organization, a gateway is used to process the message. The gateway serves as the recipient's agent in requesting the recipient's IBE private key from the IBE private key generator. The gateway then decrypts the message for the recipient so that message processing may be performed on the message before it is distributed to the recipient over the organization's network.

If desired, senders of messages can use IBE encryption to encrypt messages to the organization (or part of the organization) rather than the individual recipient. For example, if a recipient has an email address of user@us.company.com, the sender can use a value of Q to encrypt the message that is based on the domain name portion of the recipient's email address (i.e., us.company.com in this example). As another example, the sender can use a value of Q that includes only the subdomain string "company.com." With this type of approach, the message processing applications 32 at the receiving gateway can obtain the IBE private key needed to decrypt the IBE-encrypted message by using the credentials of the organization (or portion of the organization), rather than using an individual recipient's credentials. Following message processing, the recipient's identity can be used for IBE encryption and delivery over the internal network 38 of the organization or the processed version of the message may be delivered securely to the recipient using other suitable approaches (e.g., a secure link, PKE encryption, a trusted physically secure path, etc.).

The foregoing is merely illustrative of the principles of this invention and various modifications can be made by those skilled in the art without departing from the scope and spirit of the invention.

What is claimed is:

1. A method of processing incoming email messages to an organization, wherein the organization has a network, a gateway, a private key generator, and a plurality of recipients and wherein the gateway, private key generator, and recipients are connected by the network, the method comprising:

receiving an encrypted email message for a recipient in the organization with the gateway;

with the gateway, using recipient credential information to request a private key of the recipient from the private key generator;

using the recipient credential information at the private key generator to determine whether the gateway is authorized to obtain the requested private key, and, if the gateway is authorized, generating the requested private key in real time;

providing the private key that has been generated by the private key generator to the gateway; and at the gateway, using the private key to decrypt the email message.

2. The method defined in claim 1 wherein the gateway has an identity-based-encryption (IBE) decryption engine and wherein using the private key to decrypt the email message comprises using the IBE decryption engine to decrypt the email message at the gateway.

3. The method defined in claim 1 wherein the gateway is connected to the Internet by a firewall, the method further comprising receiving the encrypted email message with the gateway through the firewall.

4. A method of processing email messages in an organization, wherein the organization has a network, a gateway, a private key generator, and a plurality of recipients and wherein the gateway, private key generator, and recipients are connected by the network, the method comprising:

receiving an encrypted email message for a recipient in the organization with the gateway;

with the gateway, using recipient credential information to request a private key of the recipient from the private key generator;

at the gateway, receiving the private key from the private key generator; and at the gateway, using the private key to decrypt the email message.

5. The method defined in claim 4 wherein the gateway has an identity-based-encryption (IBE) decryption engine and wherein using the private key to decrypt the email message comprises using the IBE decryption engine to decrypt the email message at the gateway.

6. The method defined in claim 4 wherein the gateway is connected to the Internet by a firewall, the method further comprising receiving the encrypted email message with the gateway through the firewall.

7. The method defined in claim 4 further comprising:
at the gateway, scanning the decrypted email message for viruses to produce a scanned version of the email message; and
providing the scanned email message from the gateway to the recipient.

8. The method defined in claim 7 further comprising:
processing the decrypted email message at the gateway to determine whether to edit the email message; and
if it is determined that the email message is to be edited, using a message editor at the gateway to edit the email message.

9. The method defined in claim 8 wherein processing the decrypted email message at the gateway to determine whether to edit the email message comprises determining that the email message includes an attachment that contains a virus and wherein using the message editor at the gateway to edit the email message comprises removing the attachment.

10. The method defined in claim 7 further comprising:
processing the decrypted email message at the gateway to determine whether to generate a notification; and
if it is determined that a notification is to be generated, using the gateway to generate the notification.

11. The method defined in claim 10 wherein processing the decrypted email message at the gateway to determine whether to generate a notification comprises determining that the email message includes an attachment that contains a virus and wherein using the gateway to generate the notification comprises generating an alarm.

12. The method defined in claim 4 further comprising:
processing the decrypted email message at the gateway to determine whether to generate a notification; and
if it is determined that a notification is to be generated, using the gateway to generate the notification.

13. The method defined in claim 12 wherein processing the decrypted email message at the gateway to determine whether to generate a notification comprises processing the decrypted email message at the gateway to determine whether the email message violates an organizational policy and wherein using the gateway to generate the notification comprises sending a notification message to an appropriate party that identifies the organizational policy violation.

14. The method defined in claim 12 wherein processing the decrypted email message at the gateway to determine whether to generate a notification comprises processing the decrypted email message at the gateway to determine whether the email message contains a sensitive document as an attachment.

15. The method defined in claim 4 further comprising:
processing the decrypted email message at the gateway to determine whether to edit the email message; and
if it is determined that the email message is to be edited, using a message editor at the gateway to edit the email message.

16. The method defined in claim 15 wherein processing the decrypted email message at the gateway to determine whether to edit the email message comprises determining that the email message includes sensitive information and wherein using the message editor at the gateway to edit the email message comprises removing the sensitive information.

17. The method defined in claim 4 further comprising:
processing the decrypted email message at the gateway to determine whether to archive the email message; and
if it is determined that the email message is to be archived, using a database controller to save a copy of the email message in a database of the organization.

18. The method defined in claim 17 wherein processing the decrypted email message at the gateway to determine whether to archive the email message comprises determining that the email message includes a virus and wherein using the database controller to save the copy of the email message in the database of the organization comprises saving a copy of the email message that includes the virus.

19. The method defined in claim 17 wherein processing the decrypted email message at the gateway to determine whether to archive the email message comprises determining that at least one condition is satisfied, wherein the at least one condition is selected from the group consisting of: the email message contains a particular type of data, the email message contains patient data, the email contains medical data, the email message originated from a particular sender, the email message originated from a physician, the recipient that the email message is destined to is a particular recipient, and the recipient that the email message is destined to is a patient, and wherein using the database controller to save the copy of the email message in the database of the organization comprises saving of copy of the email message.

* * * * *